United States Patent
Moritome et al.

(10) Patent No.: US 6,589,117 B1
(45) Date of Patent: Jul. 8, 2003

(54) FISHING GAME SYSTEM AND INPUT DEVICE THEREFOR

(75) Inventors: Yasuyuki Moritome, Kawasaki (JP); Hajime Kawashima, Kobe (JP); Eiji Yokoi, Kobe (JP)

(73) Assignee: Konami Co., Ltd., Hyogo-ken (JP)

(*) Notice: Subject to any disclaimer, the term of this patent is extended or adjusted under 35 U.S.C. 154(b) by 0 days.

(21) Appl. No.: 09/206,352

(22) Filed: Dec. 7, 1998

(30) Foreign Application Priority Data

Dec. 9, 1997 (JP) ............................................. 9-361872
Feb. 17, 1998 (JP) .......................................... 10-035284

(51) Int. Cl.[7] ............................................... A63F 13/00
(52) U.S. Cl. ............................................ 463/37; 463/7
(58) Field of Search ...................................... 463/7, 37

(56) References Cited

U.S. PATENT DOCUMENTS

| | | | | |
|---|---|---|---|---|
| 5,232,223 A | * | 8/1993 | Dornbusch | 273/148 B |
| 5,542,672 A | * | 8/1996 | Meredith | 463/37 |
| 5,713,792 A | | 2/1998 | Ohzono et al. | |
| 5,730,655 A | * | 3/1998 | Meredith | 463/37 |
| 5,733,195 A | * | 3/1998 | Wall | 463/47.2 |
| 5,825,347 A | * | 10/1998 | Prinsen | 345/112 |
| 5,897,437 A | * | 4/1999 | Nishiumi et al. | 463/47 |
| 5,926,438 A | * | 7/1999 | Saito | 367/111 |

FOREIGN PATENT DOCUMENTS

| | | |
|---|---|---|
| JP | S60166393 | 11/1985 |
| JP | 02049594 U | 11/1986 |
| JP | S63-174681 | 7/1988 |
| JP | 02185278 A | 7/1990 |
| JP | 05192449 A | 8/1993 |
| JP | 0648777 U | 7/1994 |
| JP | 07204356 A | 8/1995 |
| JP | 08173632 A | 7/1996 |
| JP | 08196742 A | 8/1996 |
| JP | 08289981 A | 11/1996 |
| JP | 09000740 A | 1/1997 |
| JP | 10305165 | 11/1998 |
| JP | S61182788 | 11/1998 |

OTHER PUBLICATIONS

Bio–Hazard (Magazine), Mar. 22, 1997, Publisher–KK ASCCI, Author: Esaki Kazuo et al.

* cited by examiner

*Primary Examiner*—Michael O'Neill
(74) *Attorney, Agent, or Firm*—Jordan and Hamburg LLP

(57) ABSTRACT

A fishing game system is designed to sufficiently reproduce a feeling of actual fishing with a simple mechanism. A fishing game system includes a display device for displaying an image, an input device from which a signal is outputted in response to operation by a player, and a game control device for referring to the signal outputted from the input device to perform a fishing game on a screen of the display device in accordance with a predetermined procedure. The input device includes an operation lever operable in a lateral direction as well as a forward-backward direction to the player, and a handle arranged on the operation lever rotatably operable about an axial line in the lateral direction. The operation of the operation lever in the forward-backward direction corresponds to the up and down operation of an actual fishing rod, while the operation of the operation lever in the lateral direction corresponds to the lateral-directional operation of the fishing rod. In addition, the rotational operation of the handle in a predetermined direction corresponds to a reeling-up operation of an actual fishing line. Through these operations, an operation of a lure and a landing of fish may be evaluated.

21 Claims, 22 Drawing Sheets

FISHING GAME SYSTEM AND INPUT DEVICE THEREFOR

BACKGROUND OF THE INVENTION

The present invention relates to a fishing game system and an input device preferably used for the game, with which a player can enjoy a virtual experience of fishing through virtual game images.

In fishing (or angling) games of this kind, how a feeling of operating a fishing rod and a reel is reproduced is an essential factor which attracts player's interest. From this point of view, a conventional fishing game system is provided with an operation lever arranged at a front position on a console attached to a frame of the game system and an input unit with a handle arranged on the operation lever. The operation lever is formed into a fishing-rod-like shape and is operable forward and backward directions of the player. The handle imitates a fishing reel. Thus, a play mode is realized by moving the operation lever forward and backward as if to handle a fishing rod up and down, and by rotating the handle as if to reel up a fish toward the player.

There exists another type of conventional fishing game system in which an input unit imitating a reel on an axial member separated from a frame, but connected with the frame by a flexible wire and others. By this configuration, a player can freely operate the axial member in any three-dimensional direction as if the player handles an actual fishing rod. On the basis of tension applied to the wire and other factors, the movement of the axial member is detected.

However, the above conventional fishing game systems still have the following drawbacks. In the case of the former type, the operation of the operation lever is restricted to the forward-backward direction of a player. As a result, it is difficult to satisfactorily reproduce the action of moving the fishing rod rightward and/or leftward to resist the pulling forth of the fishing line caused by a running fish, and/or, to make a various tricky lure action which is considered important in lure fishing. On the other hand, in the latter system, the problems that the first system poses are removed. However, there is another problem that a special sophisticated mechanism is necessary for detecting the movement of the axial member, resulting in an increased manufacturing cost of game systems.

SUMMARY OF THE INVENTION

Accordingly, it is an object of the present invention to provide a game system and an input device therefor, which are capable of sufficiently reproducing a feeling of actual fishing with a simple mechanism for inputting operational information.

According to one aspect of the invention, the forgoing object is realized by a fishing game system including: a display device for displaying an image; an input device for outputting a signal in response to an operation by a player; and a game control device for referring to the signal outputted from the input device to perform a fishing game on a screen of the display device in accordance with a predetermined procedure, wherein the input device includes a first input unit having an operation lever operable in a lateral direction and a forward-backward direction of the player and for outputting a signal in accordance with the operation of the operation lever; and a second input unit having a handle arranged on the operation lever rotatably operable about an axial line in the lateral direction and for outputting a signal in accordance with the operation of the handle.

By this invention, the operations of the operation lever in the forward-backward direction and in the lateral direction can express the operations of an actual fishing rod, and the rotational operation of the handle can express the reeling-up operation of an actual reel. These operations change the reactions of virtual fishes in the game or the actions of the lure, thus sufficiently reproducing a feeling of actual fishing.

The operation lever may have a housing imitating a fishing reel, and the handle may be rotatably supported by the housing. By this, since the handle is operated with holding the reel-like housing, a feeling of operating a fishing reel can be reproduced. Since it is easily understood, at a glance, that this system is a fishing game system from the appearance of the input device, it is possible to promptly attract people who are interested in this kind of game.

The fishing game system may further include a resistance adjusting unit for changing a rotation resistance of the handle. By this configuration, the rotational resistance of the handle can be added to the progressing factors of the game.

The game control device may change the rotation resistance of the handle adjusted by the resistance adjusting unit in accordance with progress of the game. Thus, by way of example, the rotational resistance of the handle can be changed in accordance with the size or struggling action of a hooked fish. Practicing this invention makes it possible to enhance the enjoyment of the game by increasing or decreasing the rotational resistance according to the progress of the game.

The fishing game system may further include a vibrating unit for applying vibration to the operation lever. Therefore, the vibration of the operation lever can be added to the progressing factors of the game.

The game control device may control a vibration applying state to the operation lever performed by the vibrating unit in accordance with progress of the game. Therefore, for example, when a fish bites a lure, the operation lever can be vibrated to reproduce a feeling like the actual bite of the fish.

The input device may further include a third input unit having an operation element attached on the operation lever independently of the handle and for outputting a signal in accordance with the operation of the operation element, and wherein the game control device controls the progress of the fishing game by assigning the operation of the operation element of the third input unit to a loosening operation of a tension of a virtual fishing line used in the game for a period from casting until picking-up of a fishing-rig. This feature makes it possible to use handling techniques, such as a free run of a fish or preventing a fishing line from being cut, by the loosening operation of the tension of the fishing line. Performing such techniques provides the game with a feeling closer to actual fishing. The fishing-rig referred herein includes jigs for use in the fishing with both live bait and pseudo-bait such as lures.

The input device may further include a fourth input unit for outputting a signal in accordance with operation of the player, and wherein the game control device decides a casting position of a fishing-rig in a virtual fishing place realized in the game on the basis of both the operation of the fourth input unit and the operation in the lateral direction of the operation lever. In this configuration, the casting position is decided based on the combined operation of the operation lever and the fourth input unit, so that the casting position can be freely changed according to the operator's operation. By advancing the game such that there arise differences in fishing results according to the casting positions, the game can produce a feeling like actual fishing.

When the fishing-rig is cast in the game, the game control device may display a casting gauge on a screen of the display device, changes an amount shown by the gauge continuously, decides a casting distance of the fishing-rig based on a relationship between the amount shown by the gauge and an operational timing to the fourth input unit, and decides a casting direction of the fishing-rig based on an operated amount in the lateral direction of the operation lever. With this treatment, operating the fourth input unit at proper timing with watching the continuously changing gauge amount enables the fishing-rig to be cast at a desired distance. Additionally, operating the operation lever in the lateral direction permits the fishing-rig to be cast into a desired direction.

The game control device may control the progress of the fishing game by assigning an operation of the operation lever in the lateral direction to a movement in the lateral direction of a virtual fishing rod used in the game and assigning a rotational operation of the handle in a given direction to a reeling-up operation of a virtual fishing line used in the game for a period from casting until picking-up of the fishing-rig. By practicing this invention, the operations of swinging the fishing rod rightward and/or leftward and of reeling up the fishing line can be reproduced in the game. It is possible to control the progress of the game in which the player successfully catches the fish or fails to catch the fish. Thus a feeling of actual fishing is reflected fully on the game.

The game control device may display, on the screen, an image of a fish which was caught in the game and control a displayed state of the image of the fish to change a viewing position of the fish according to operation of the operation lever. Therefore, it is possible to view the caught fish from various positions, increasing player's satisfaction.

The display device may be arranged in a given frame and have a control panel detachably attached to the frame at a position under the display device, and the operation lever may be attached to the control panel. Thus, only arranging the control panel in an existing frame in place of an old control panel can build up the frame into a new one adaptable to a fishing game.

According to another aspect of the invention, the foregoing object is solved by providing an input device for a game including: a first input unit having an operation lever operable in a lateral direction and a forward-backward direction of a player and for outputting a signal in accordance with the operation of the operation lever; and a second input unit having a handle arranged on the operation lever rotatably operable about an axial line in the lateral direction and for outputting a signal in accordance with the operation of the handle.

In this invention, swinging the operation lever rightward and/or leftward as well as back and forth can express operations of an actual fishing rod, and rotationally operating the handle can express a reeling-up operation of an actual reel.

In this input device, the operation lever may have a housing imitating a fishing reel, and the handle may be rotatably supported by the housing. Thus, owing to the fact that the handle is operated with holding the reel-like housing, a feeling of operating the reel can be reproduced.

The input device may further include a vibrating unit for applying vibration to the operation lever. Applying vibration to the operation lever can reproduce a state in which a fish bites bait.

According to still another aspect of the invention, the foregoing object is solved by providing an input device for a game including: an axial grip to be held by a player; a handle rotatably operated about an axial line orthogonal to a longitudinal direction of the grip; and a resistance adjusting unit for changing a rotation resistance of the handle according to an input signal. In this invention, increasing or decreasing the rotational resistance of the handle can reproduce a state in which resistance caused in reeling up the fishing line is changed in agreement with the sizes or struggling action of the fish.

According to still another aspect of the invention, there is provided an input device for a game including: a handle rotationally operable about a given axial line by a player; a electromagnetic brake for applying rotational resistance to the handle; and a brake drive circuit for changing a braking force of the electromagnetic brake according to an input signal. In this invention, braking force generated by the electromagnetic brake can be controlled by the brake drive circuit, and hence the rotational resistance of the handle can be changed. Applying this input device to a fishing game system permits of the rotational resistance of the handle to be changed in accordance with the sizes of the fish or other factors, thus enhancing enjoyment of the game.

The brake drive circuit may change an exciting current supplied to a coil disposed in the electromagnetic brake based on a pulse width modulation control by which a pulse width of the exciting current is controlled according to the input signal. Since the pulse width modulation method which is used as one of rotational control methods of DC motors is applied to control of the electromagnetic brake, its braking force can be controlled with its simple configuration maintained.

According to still another aspect of the invention, there is provided an input device for a game including: a handle rotationally operable about a given axial line by a player; a rotational member arranged to rotate integrally with the handle in a rotational direction and having a number of engaged portions arranged at given pitches along the rotational direction; and a click member having an engaging portion for engagement with the engaged portions when the engaging portion is pressed against the rotational member, wherein the engaging portion has a shape to make an intimate contact with both sides of the engaged portions in the rotational direction of the rotational member.

Therefore, the engaging portion engages with the engaged portions to sustain both the rotational member and the handle at constant positions with regard to the rotational direction. When rotating the handle against the pressing force of the click member onto the rotational member, the rotational member rotates with shifting the engagement positions between the engaging portion and the engaged portions. The shift of the engagement positions produces a feeling like clicking. Due to the intimate engagement between the engaging portion and the engaged portions in both sides of the rotational member in its rotational direction, play or looseness of the handle is prevented, thereby raising quality of rotationally operating the handle. Adopting this input device to a fishing game provides a feeling of operating high-class reels.

According to still another aspect of the invention, there is provided a fishing game system including: a display device for displaying an image; an input device for outputting a signal according to operation of a player; and a game control device for referring to the signal outputted from the input device to perform a fishing game on a screen of the display device in accordance with a predetermined procedure, wherein the game control device includes a calculating unit for calculating an easy-to-fish degree at each position in a fishing place displayed on the display device, and a mark displaying unit for displaying a particular mark at one position in the fishing place displayed on the display device on the basis of a calculated result by the calculating unit. In this fishing game system, a mark is shown on the screen of the display device according to an easy-to-fish degree in a fishing place. Therefore, it is possible to configure the fishing game system such that a lure or other fishing-rig can be cast at a desired position in a fishing place according to the operation of the input device. In such a case, a mark can be displayed as a casting target to help the player to decide a desired casting position.

The mark displaying unit may display the mark at one position relatively higher in the easy-to-fish degree than the other positions in the fishing place. By this, a mark is displayed at a relatively easier fishing position. Since the player can decide casting positions with the aid of the mark, it is easy to achieve a better fishing result. Displaying the mark allows the players, who have less knowledge in fishing, to easily get familiarity with the game.

The mark displaying unit may display the mark at one position selected from positions other than a position having a highest easy-to-fish degree. In this invention, the easiest fishing spot is hidden, leaving the player fun to find out such a secret spot. Thus, the players can enjoy the game from a variety of aspects.

The mark displaying unit may display a fish shadow as the mark. By this, only seeing a fish shadows displayed on the screen of the display device makes it possible to understand easy fishing spots intuitively.

DESCRIPTION OF THE PREFERRED EMBODIMENTS

Referring to the accompanying drawings, a preferred embodiment of the present invention will be described below.

Figure 1:
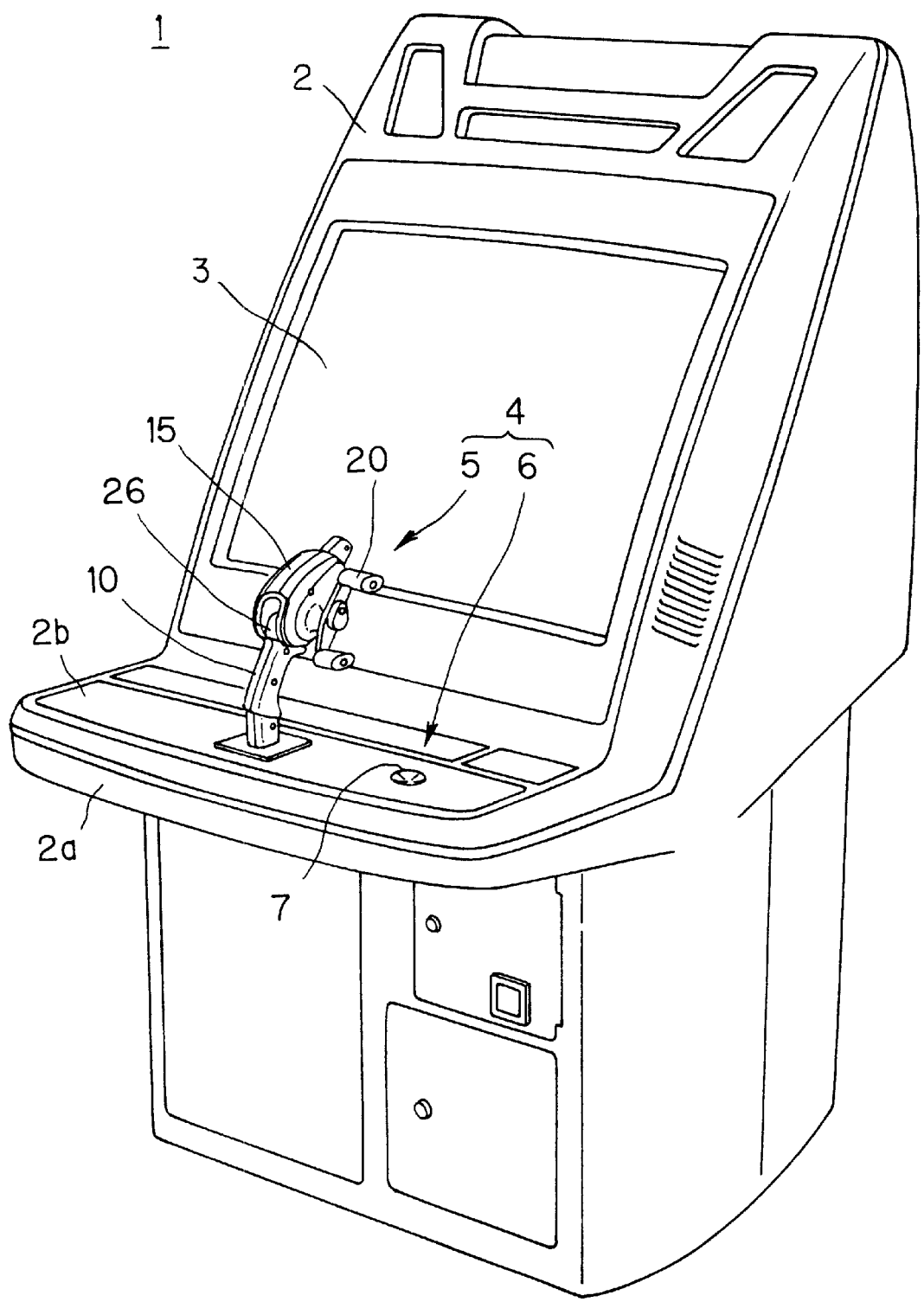
FIG. 1 is a perspective view schematically showing a fishing game system to which the present invention is applied.

FIG. 1 shows a schematic configuration of a fishing game system to which the present invention is applied. The fishing game system 1 is provided with a frame 2, a display device 3, and an input device 4. The display device 3, which includes a CRT serving as a main constituent, is disposed in the upper front of the frame 2 in such a fashion that the displaying screen of the CRT is directed obliquely upwardly. At the middle part of the frame 2, under the display device 3, the frame 2 is formed with a table-like overhang portion 2a. On the upper surface of the overhang portion 2a, a control panel 2b is detachably attached via members such as screws.

The input device 4 includes a main input unit 5 arranged at an approximately central portion of the control panel 2b and a sub-input unit 6 arranged at a right-side position of the control panel 2b (functioning as a fourth input unit). The main input unit 5 has an operation lever 10 and a handle 20 attached to the operation lever 10. The sub-input unit 6 has a single push-button switch 7.

Figure 2:
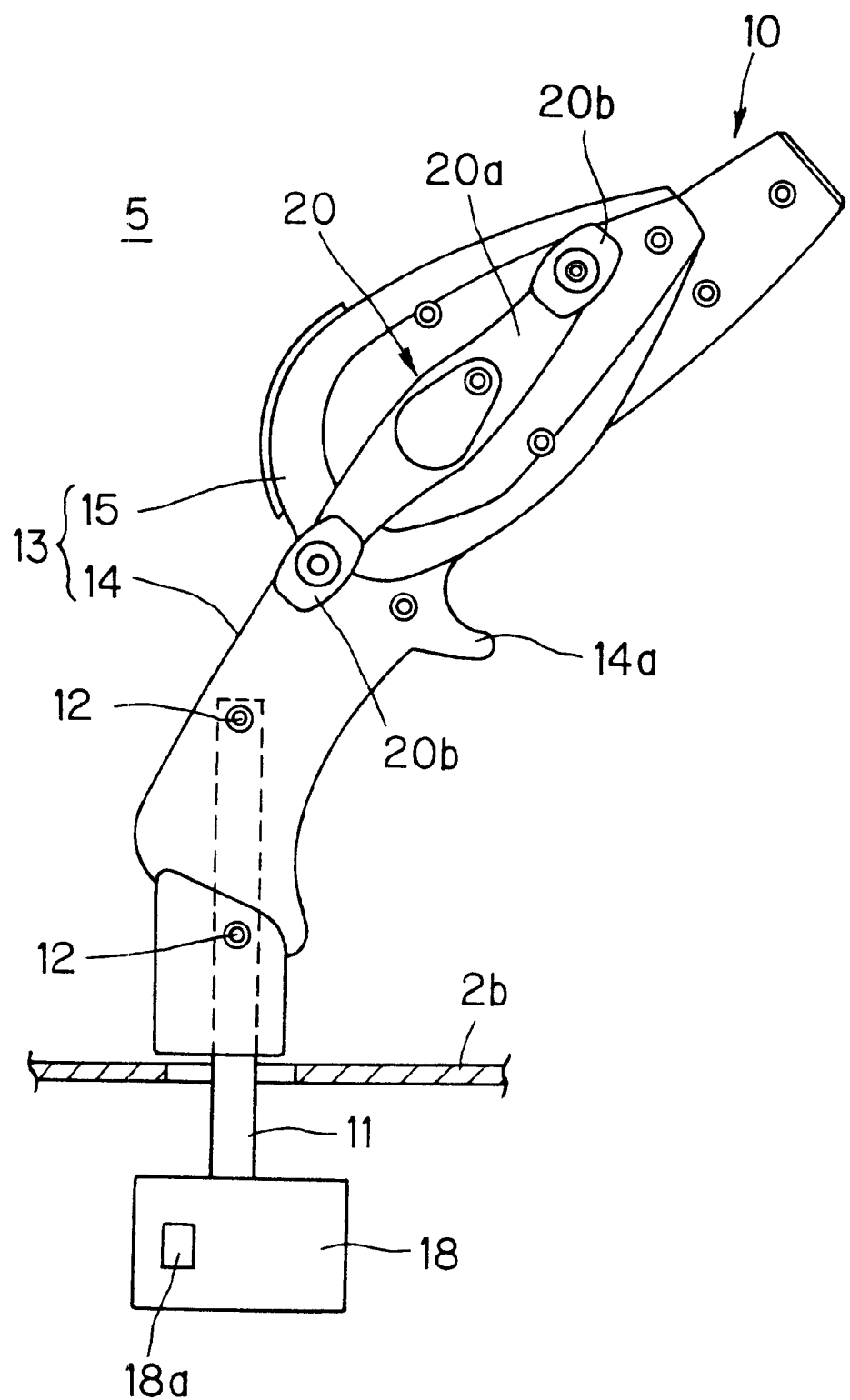
FIG. 2 is a side view of an operation lever arranged in the game system in FIG.1.

As shown in FIG. 2, the operation lever 10 is provided with a lever axis 11 arranged to vertically pass through the control panel 2b, and a grip 13 fixed to the upper part of the lever axis 11 with bolts 12. The lever axis 11 is supported by a supporting and detecting mechanism 18 at its lower end. The mechanism 18 supports the lever axis 11 such that the lever axis 11 is able to move obliquely, using its lower end as a fulcrum, toward both the forward-backward direction of the game system 1 (corresponding to the lateral direction in FIG. 2) and the lateral direction thereof (corresponding to a direction perpendicular to the drawing sheet of FIG. 2). The mechanism 18 has a lever operation detecting sensor 18a for outputting a signal depending on an operated direction and operated amount of the lever axis 11. The operation lever 10 and the supporting and detecting mechanism 18 constitute a first input unit. As an element consisting of the lever axis 11 and the mechanism 18, a joystick input device generally used in game systems can be used.

Figure 3:
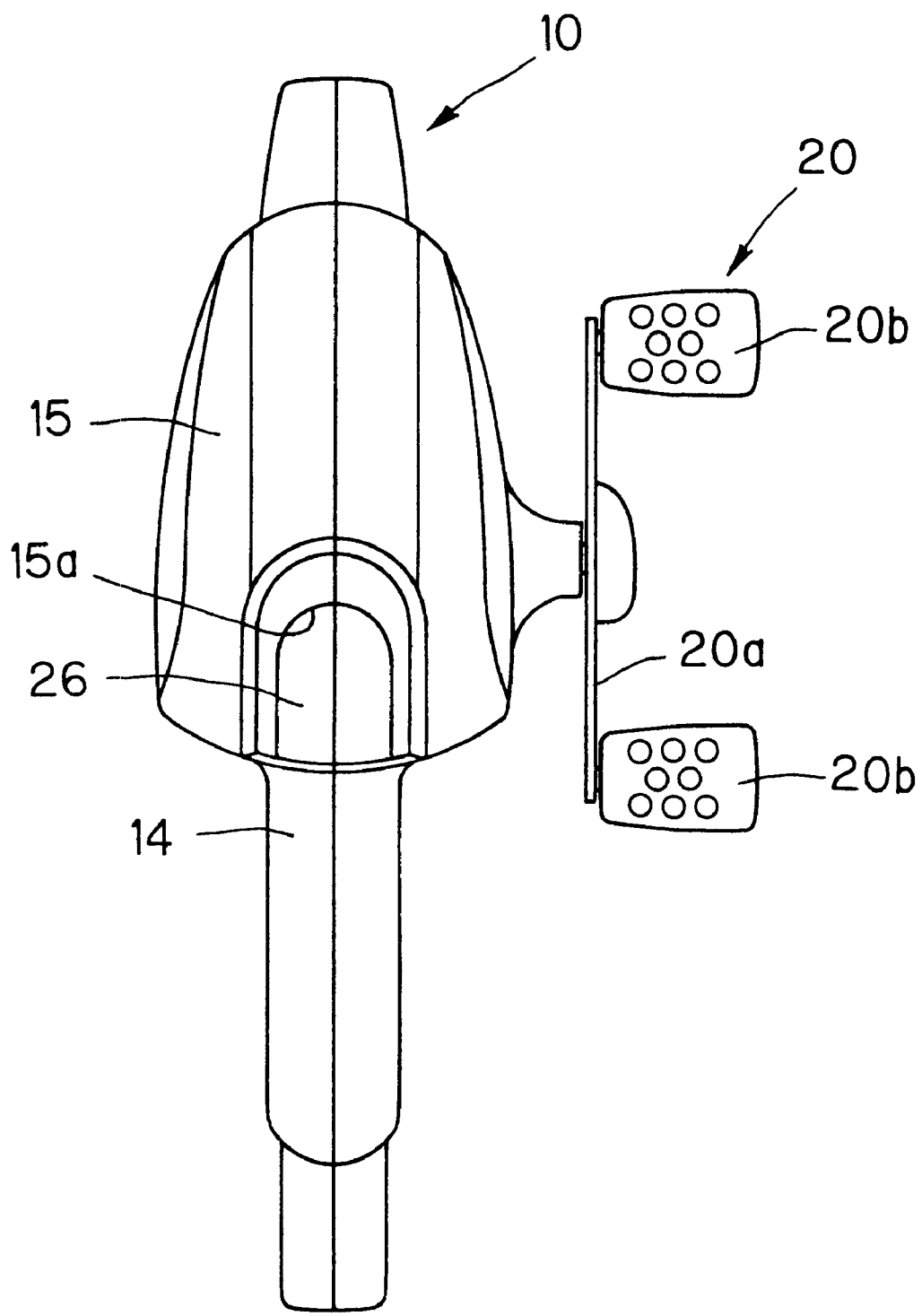
FIG. 3 is a front view of the operation lever shown in FIG. 2.

As shown in FIGS. 2 and 3, the grip 13 includes a rod-like member 14 having a shape which imitates the grip end of a fishing rod and a housing 15 integrally formed with the rod-like member 14. The housing 15 is formed into a fishing reel shape, in particular, a shape imitating the appearance of a bait reel. A finger-latching portion 14a is formed on the rod-like member 14.

Figure 4:
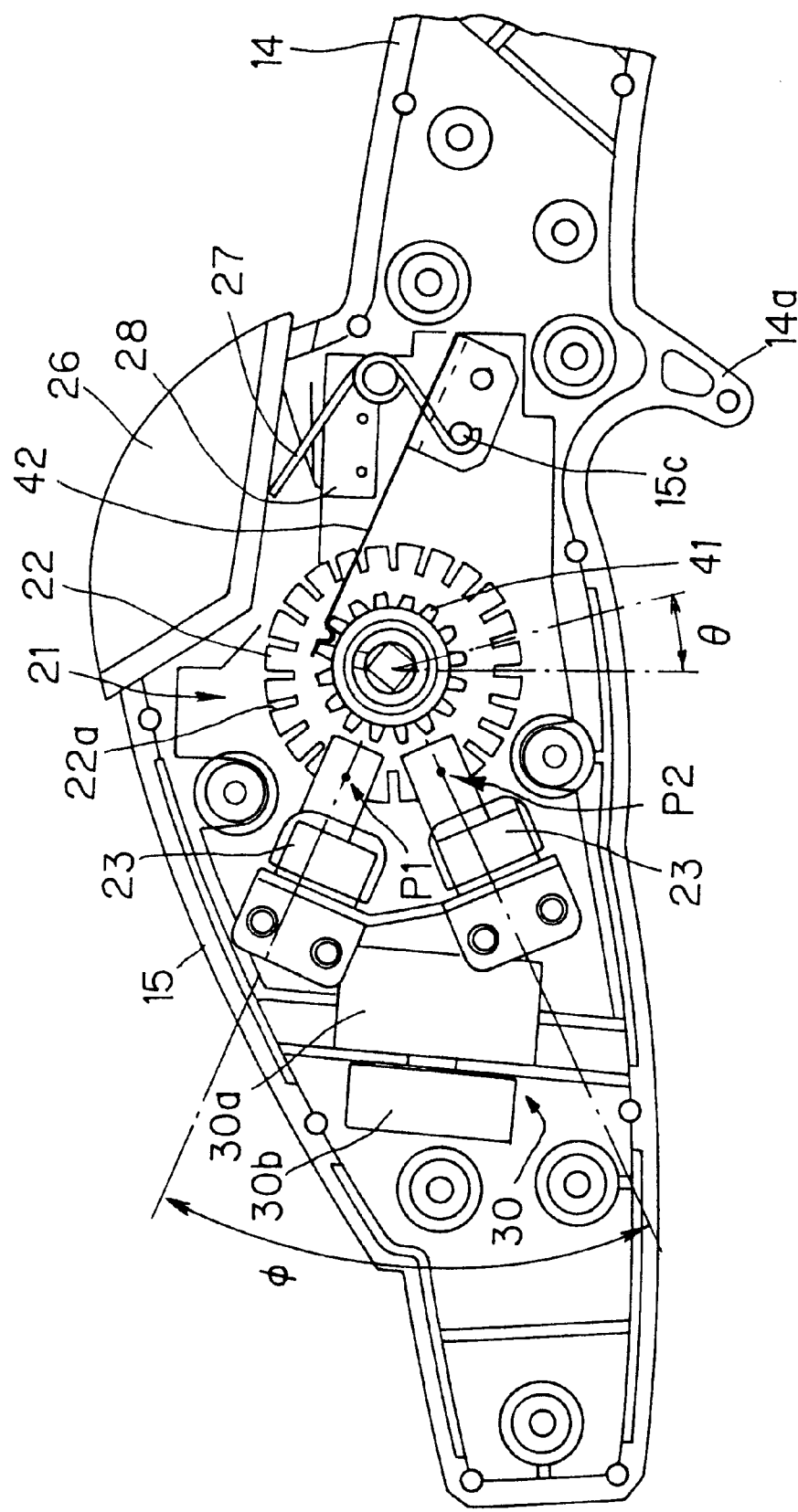
FIG. 4 is a longitudinal sectional view along the forward-backward direction of the operation lever in FIG. 2.
Figure 5:
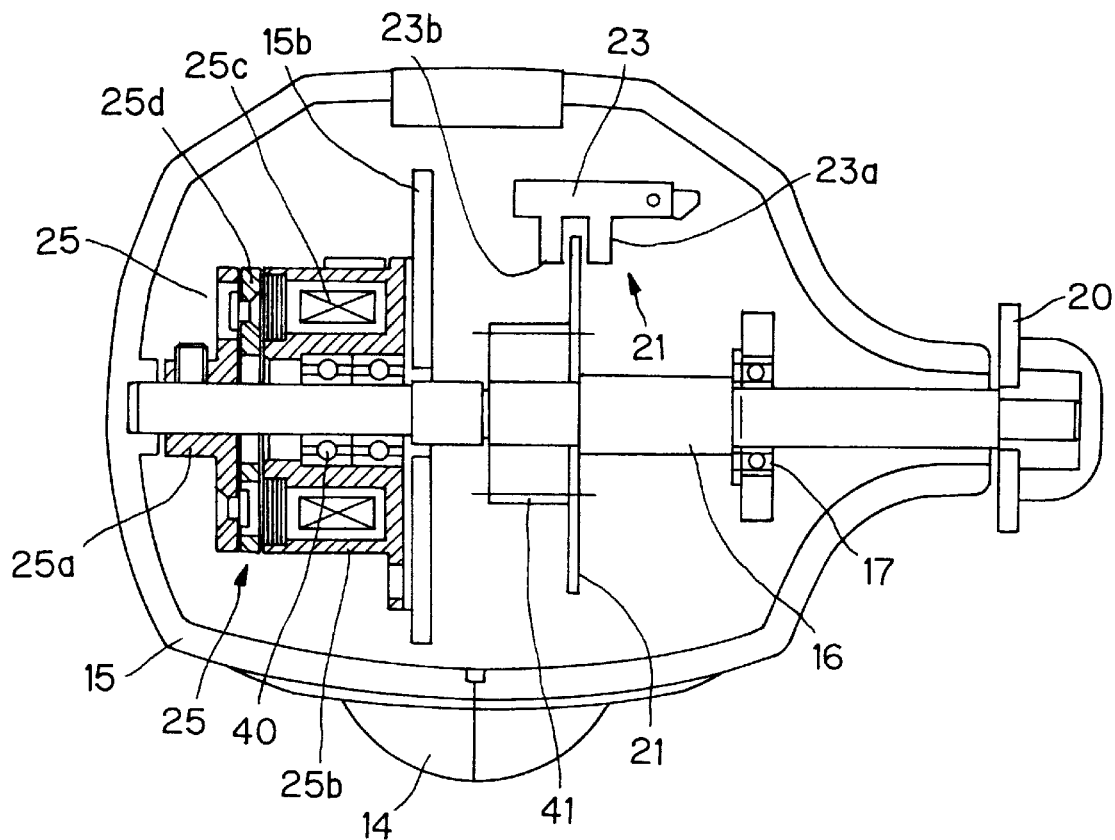
FIG. 5 is a longitudinal sectional view along the lateral direction of the operation lever in FIG. 2.

As illustrated in FIGS. 4 and 5, inside the housing 15, a handle axis 16 extending in the lateral direction is rotatably disposed with a bearing or others. The right end portion of the handle axis 16 extends outwardly of the housing 15, and the handle 20 is integrally and rotatably attached to the extended portion. As shown in FIG. 3, the handle 20 has a lever 20a fixed to the handle axis 16 and a pair of hand-latching portion 20b rotatably attached to the ends of the lever 20a.

Inside the housing 15, a rotation detecting mechanism 21 outputting a signal depending on the rotation of the handle 20 is arranged. The rotation detecting mechanism 21 is provided with a slit disc 22 integrally rotatably attached to the handle axis 16, and a pair of photosensors 23 arranged to face the outer surface of the slit disc 22. A number of slits 22a, . . . having given angle pitches θ along its circumference direction are formed on the outer surface of the slit disc 22. Each photosensor 23 radiates a given light beam from its light-emitting member 23a toward its light-receiving member 23b (refer to FIG. 5), and outputs a predetermined ON/OFF signal in accordance with light intensity received by the light-receiving member 23b. As shown in FIG. 4, the detection points P1 and P2 of the photosensors 23 are shifted to each other by a specified angle φ about the handle axis 16. The angle φ is set to a value which does not accord with "N×θ/2 (N is integer) with regard to the angle pitch φ of the slits 22a.

According to the foregoing rotation detecting mechanism 21, rotationally operating the handle 20 allows both the handle axis 16 and the slit disc 22 to rotate together, with the result that the output signals from the photosensors 23 become cyclic between their ON and OFF levels in accordance with a rotational speed of the handle 20. A rotational amount of the handle can be computed based on the number of the ON/OFF repetition, and a rotational speed can be computed based on its repetition cycle. Furthermore, based on differences in phase between the output signals from the two photosensors 23 (specifically, based on a shift in timing when the signals switch between the ON and OFF levels), a rotational direction of the handle 20 can be determined. The handle 20, the handle axis 16, and the rotation detecting mechanism 21 constitute a second input unit.

As understood from FIG. 5, an electromagnetic brake 25 is arranged within the housing 15. The brake 25 is provided with a rotor 25a coupled with the handle axis 16 so that both the elements rotate together, a coil housing 25b rotatably attached to the handle axis 16 via a bearing 40, and a coil 25c incorporated in the coil housing 25b. The coil housing 25b is secured by a supporting plate member 15b arranged in the housing 15, and is not allowed to rotate about the axial line of the handle axis 16. On the surface of the rotor 25a opposing to the coil housing 25b, a suction pad 25d composed of a magnetic material is arranged so that the plate is allowed to rotate together with the rotor 25a. The suction pad 25d is constantly and forcedly pulled to the side of the rotor 25a along the handle axis 16 by a plate spring not-shown. Supplying the coil 25c DC current generates magnetic force proportionally to its current value, and the magnetic force causes the suction pad 25d to resist the plate spring, so that the pad is sucked by the coil housing 25b. Thus, the rotation of both the rotor 25a and the handle axis 16 is braked. Values of excitation current applied to the coil 25c are controlled in a multi-step manner by a drive circuit 57 later described with reference to FIG. 7.

As illustrated in FIGS. 3 and 4, at the rear end portion of the housing 15, an attaching opening 15a is formed, to which an operation button 26 is attached. The operation button 26 imitates a clutch lever installed in the rear end portion of an actual bait reel. The operation button 26 is forced to expand outwardly from the housing 15 due to a torsional coiled spring arranged within the housing 15, and is sustained at a position shown in FIG. 4 by a given stopper. Pushing the operation button 26 into the housing 15 against the force of the torsional coiled spring 27 causes a limit switch 28 arranged within the housing 15 to change its ON or OFF state, enabling to detect the activation of the operation button 26. The operation button 26, the torsional coiled spring 27, and the limit switch 28 constitute a third input unit.

As shown in FIG. 4, a vibrator 30 serving as vibrating means is placed within the operation lever 10. The vibrator 30 has such a construction that a weight 30b disposed at an eccentric position from the rotation axis of a motor 30a is rotated by the motor 30a to generate vibration. Current values applied to the motor 30a are adjusted within a certain range by a control circuit later described. Depending on the supplied current values, the motor 30a changes its rotation speed, thereby enabling the control of the vibration by the vibrator 30.

Figure 6:
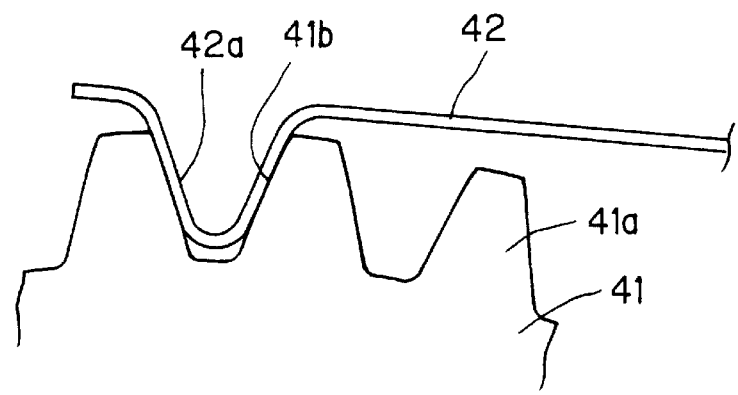
FIG. 6 is an enlarged view showing an engagement between a gear shown in FIG. 4 and a click strip.

As seen from FIGS. 4 and 5, at one side of the slit disc 22, a gear 41 is provided as a rotation member rotatable integrally with the handle axis 16. Also inside the housing 15, a click strip (click member) 42 made of spring steel is secured as a cantilever spring by a spring-latching portion 15c commonly used with the torsional coiled spring 27, and its tip portion is pressed against the gear 41 by the spring force of the click strip 42 itself. As shown in detail in FIG. 6, the tip portion of the click strip 42 is formed into an engaging part 42a curved in an approximate V-shape in agreement with the contour of a gear tooth groove 41b constituting a portion to engage with the groove of the gear 41. When the handle axis 16 is rotated, the engaging part 42a repeatedly moves over a gear teeth 41a and engages with the neighboring gear tooth groove 41b. This engagement gives a clicking feeling to the rotation of the handle axis 16. In contrast, when the handle axis 16 is not in rotation, the engaging part 42a securely engages with a gear tooth groove 41b to prevent the handle axis 16 from being rotated freely by proper force applied. The engaging part 42a has a shape to fit to the contour of the gear tooth grooves 41b, and the engaging part 42a and the gear tooth groove 41b make an intimate contact with each other in a gapless manner with respect to the rotation direction of the gear tooth groove 41b, thereby preventing or suppressing excessive play or looseness in the rotation of the handle axis 16 and improving the quality of an operational feeling.

Figure 7:
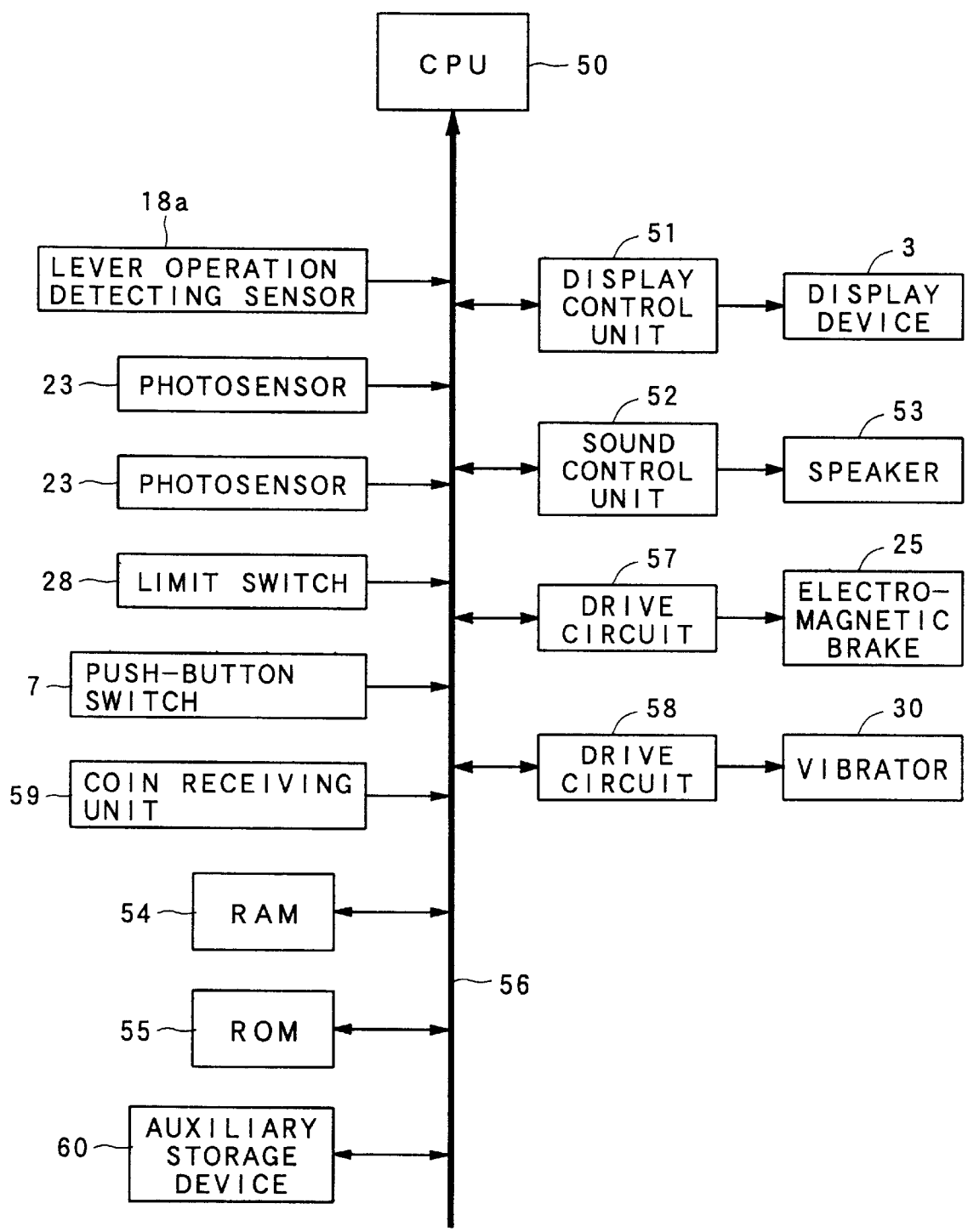
FIG. 7 is a block diagram representing a configuration of a control system of the game system.

FIG. 7 is a block diagram showing a schematic configuration of a control system of the game system 1. As shown, the game system 1, which is configured by adopting a microprocessor as a main component, includes a CPU 50 which controls various types of calculation and operation necessary for the execution of a game, a display control circuit 51 which depicts desired images on the screen of the display device 3 in accordance with a command from the CPU 50, a sound control circuit 52 which outputs desired sound from a speaker 53 in response to a command from the CPU 50, a RAM 54, a ROM 55 and an auxiliary storage device 60 which serves as storage means.

The control circuits 51 and 52, the RAM 54, the ROM 55, and the auxiliary storage device 60 are coupled with the CPU 50 through a bus 56. Also connected with the CPU 50 through the bus 56 are a lever operation detecting sensor 18a, photosensors 23, and a limit switch 28 in the main input unit 5, the push-button switch 7 in the sub-input button 6, a drive circuit 57 connected with the electromagnetic brake 25, and a drive circuit 58 connected with the vibrator 30.

Figure 8:
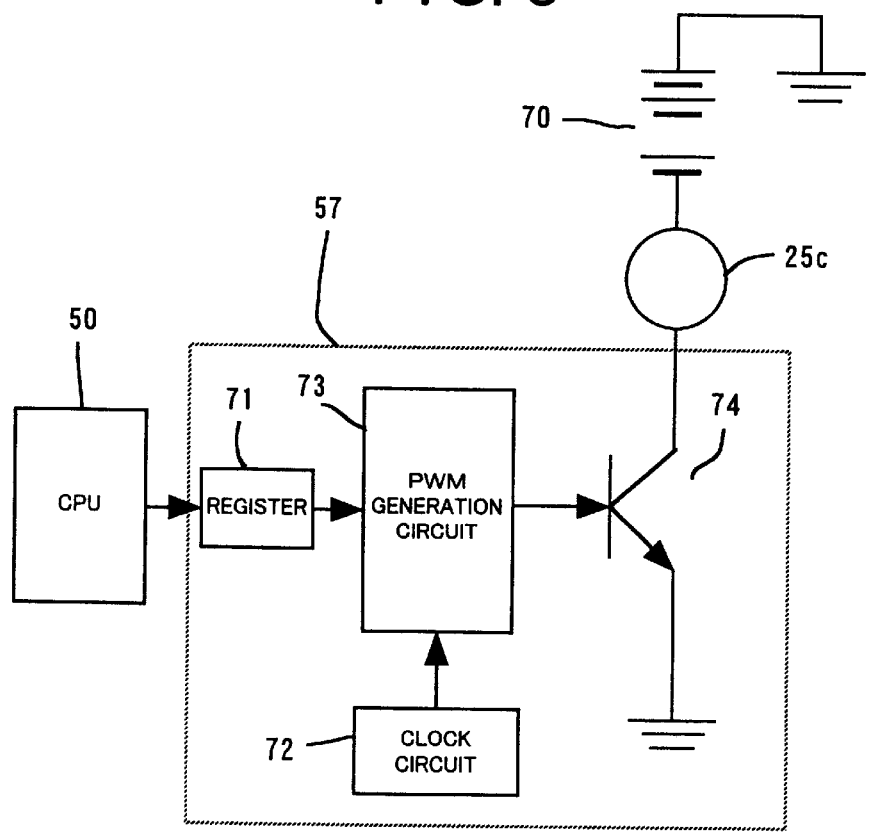
FIG. 8 is a block diagram showing a schematic configuration of a drive circuit of an electromagnetic brake installed in the control system of FIG. 7.

FIG. 8 shows the configuration of the drive circuit 57 in detail. The drive circuit 57 controls DC current values supplied from a power source 70 to the coil 25c of the electromagnetic brake 25 according to pulse width modulating method. The circuit 57 includes a register 71 for temporarily storing a 3-bits current setting signal provided from the CPU 50, a PWM generation circuit for outputting a pulse train of a given pulse width based on both the current setting signal from the register 71 and a clock signal provided from a clock circuit 72, and a transistor 74 repeatedly performing a switching operation in response to the pulse train provided by the PWM generating circuit 73.

Figure 9:
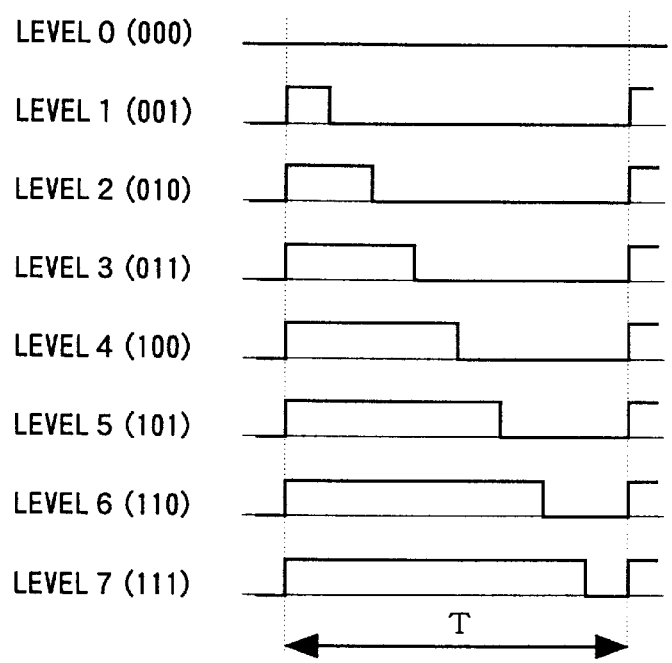
FIG. 9 is a view explaining the relationship between signals outputted from the CPU and a PWM generating circuit, both generated in the circuit of FIG. 8.

FIG. 9 shows the relationship between the current setting signal provided by the CPU 50 and the pulse train outputted by the PWM generating circuit 72. The CPU 50 selectively outputs any one of the eight steps from a level 0 expressed by a binary code "0 0 0" to a level 7 expressed by a binary code "1 1 1" for the current setting signal. In response to any of the signals having levels 1 to 7, the PWM generating circuit 73 outputs a pulse signal at every cycle T specified by the clock circuit 72. The pulse width of the pulse signal gradually increases according to the levels ranging from 1 to 7.

Depending on the width of a pulse signal outputted from the PWM generating circuit 73, the transistor 74 is controlled to perform the switching operation. As the pulse width becomes longer, an integrated value of current supplied to the coil 25c of the brake 25 increases. Specifically, magnetic force generated by the coil 25c increases dependently upon the level differences raised from the level 1, resulting in that braking force provided by the electromagnetic brake 25 increases proportionally. In the case that the PWM generating circuit 73 receives the current setting signal of the level 0 from the CPU 50, no pulse train is outputted, keeping the transistor 74 OFF. In this case, no current is supplied to the coil 25c, resulting in no braking force generated by the electromagnetic brake 25. That is, the handle axis 16 can rotate freely without any braking force from the brake 25. The combination of the drive circuit 57 and the electromagnetic brake 25 forms resistance adjusting means for the handle 20.

Like the electromagnetic brake 25, the drive circuit 58 for the vibrator 30 (refer to FIG. 7) is constructed to control a current value supplied to a coil of the motor 30a based on the pulse width modulation method. The drive circuit 58 is almost identical in construction to the drive circuit 57; that is, substituting a coil of the motor 30a for the coil 25c in FIG. 8 forms the drive circuit 58. Also the relationship between a current setting signal provided by the CPU 50 and a pulse train signal outputted by the PWM generating circuit 73 is identical in content to the example shown in FIG. 9. Thus, a concrete explanation concerning the drive circuit 58 will be omitted. As to the cycle T specified by the clock circuit 72, however, both the drive circuits 57 and 58 are set to different values.

As shown in FIG. 7, a coin receiving unit 59 is also coupled with the CPU 50 via the bus 56. The coin receiving unit 59 monitors whether or not coins have been inserted from the coin inserting hole arranged on the frame 2, detects the number of coins inserted, determines whether the inserted coins are genuine or not, and performs others necessary processing.

In the ROM 55, basic programs and data required to execute initial and other processing of the game system 1 are written. The auxiliary storage device 60 is formed by components of a large memory capacity, such as a CD-ROM drive or a hard disk. In the auxiliary storage device 60, programs expressing procedures to allow the CPU 50 to execute the fishing game and various types of image data and sound data used in the fishing game are stored. These programs and data are loaded into given areas of the RAM 54 in response to the instructions sent from the CPU 50.

Figure 10:
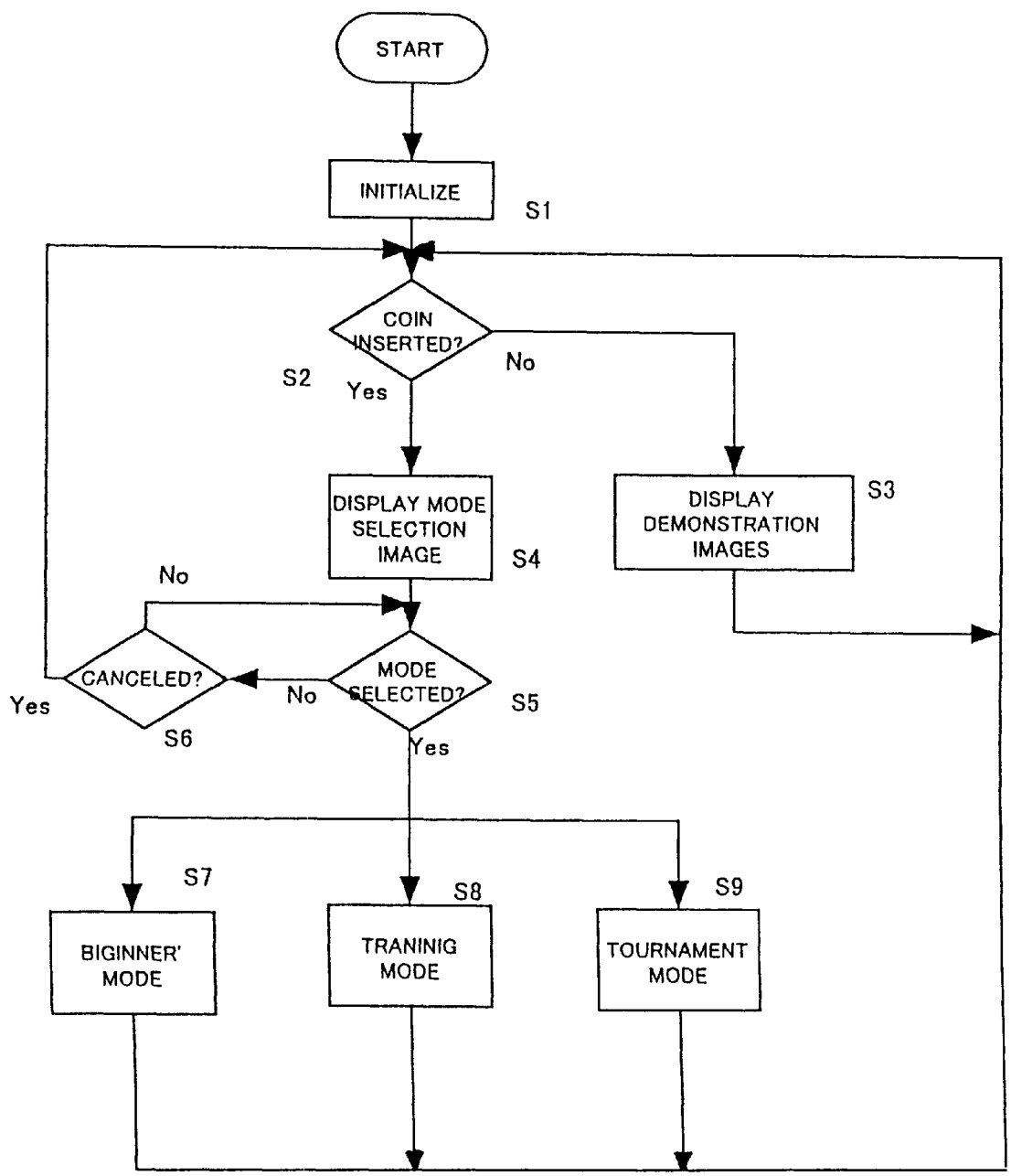
FIG. 10 is a flowchart showing a main routine of a lure fishing game executed by the control system of FIG. 7.

FIG. 10 is a flowchart showing procedures for main process of a fishing game executed by the CPU 50. In response to the predetermined initializing operation, such as the power "ON" and the reset switch "ON," the CPU 50 executes predetermined initial process according to a program which has been stored in the ROM 55 (step S1). Then, the CPU 50 determines if a specified number of coins are inserted using a signal from the coil receiving unit 59 (step S2). If the coins are not inserted yet, given demonstration images are displayed on the display device 3 (step S3), and the process waits the insertion of coins with the demonstration images displayed. In response to the insertion of coins, predetermined mode selection image is displayed on the display device 3 (step S4), and it is determined whether or not the mode selection is carried out (step S5). The mode selection is carried out, for example, by operating the operation lever 10 to select a desired mode, and then by pushing the bush-button switch 7 to finalize the selected mode. In this game system 1, selectable modes are three: the beginners' mode, the training mode, and the tournament mode.

If the mode selection is not made, it is determined whether or not a canceling operation (for example, operation demanding the return of the inserted coins) is performed (step S6). When the canceling operation is detected, the process returns to step S2, otherwise the process returns to step S5. If the affirmative determination is made at step S5, the CPU 50 executes a sub-routine which agrees with the selected mode (step S7 to S9), and then returns to step S2.

Figure 11:
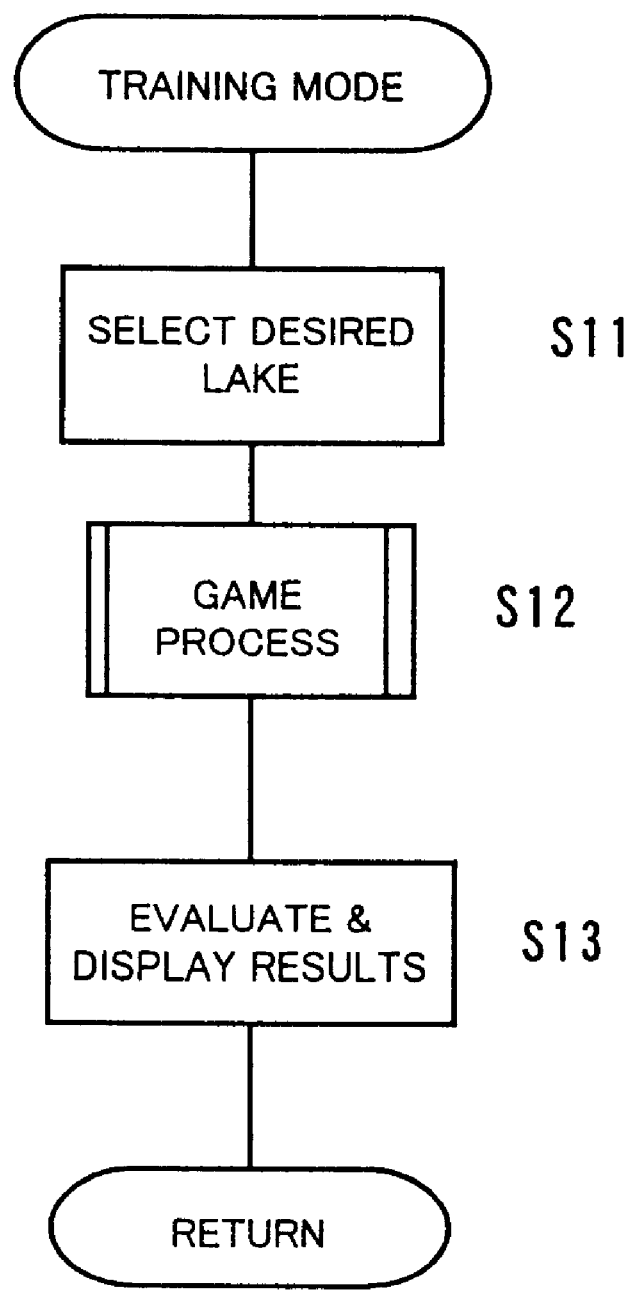
FIG. 11 is a flowchart showing the processing of a training mode executed in the main routine of FIG. 10.
Figure 15:
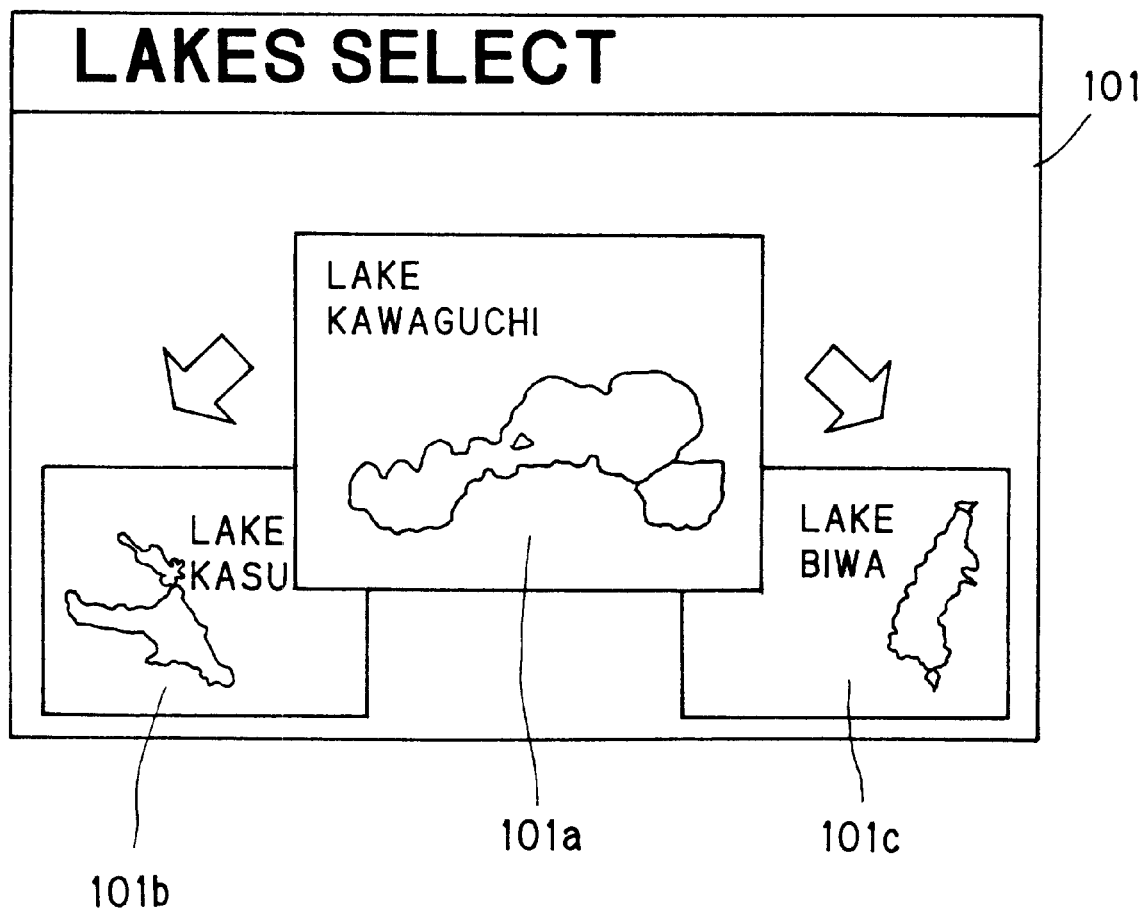
FIG. 15 is an example of an image for selecting a desired lake.

FIG. 11 is a flowchart representing process of the training mode. This training mode is prepared to simulate lure-fishing for fishes such as black bass. In this mode, first the selection of a desired lake is executed (step S11). In this process, as shown in FIG. 15, a lake selecting image 101 including a plurality of lake images 101a, 101b and 101c prepared as the options is displayed. When a player selects a desired lake among the options with the input device 4, the selection is detected by the CPU 50, and then written into the RAM 54. In the exemplified image in FIG. 15, a plurality of lakes famous for black bass fishing are displayed as the options.

The selection of a lake is followed by executing the processing of the game, wherein pseudo-experience of fishing is performed according to predetermined procedures (step S12). After the game processing, the results performed in the game are evaluated and displayed (step S13). Then, the process returns to step S2 in FIG. 10.

Figure 12:
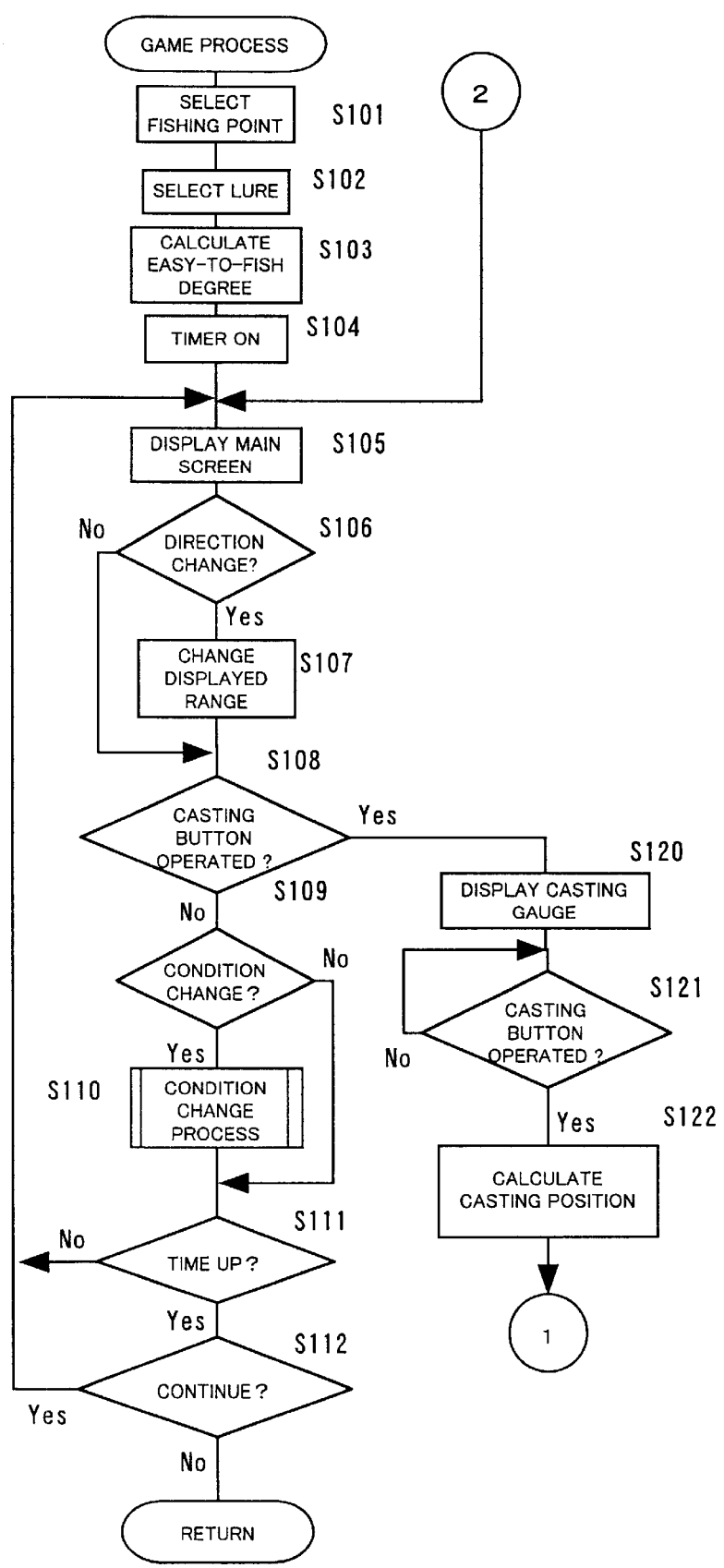
FIG. 12 is a flowchart showing detailed procedure of the processing for the game executed in the processing shown in FIG. 11.
Figure 13:
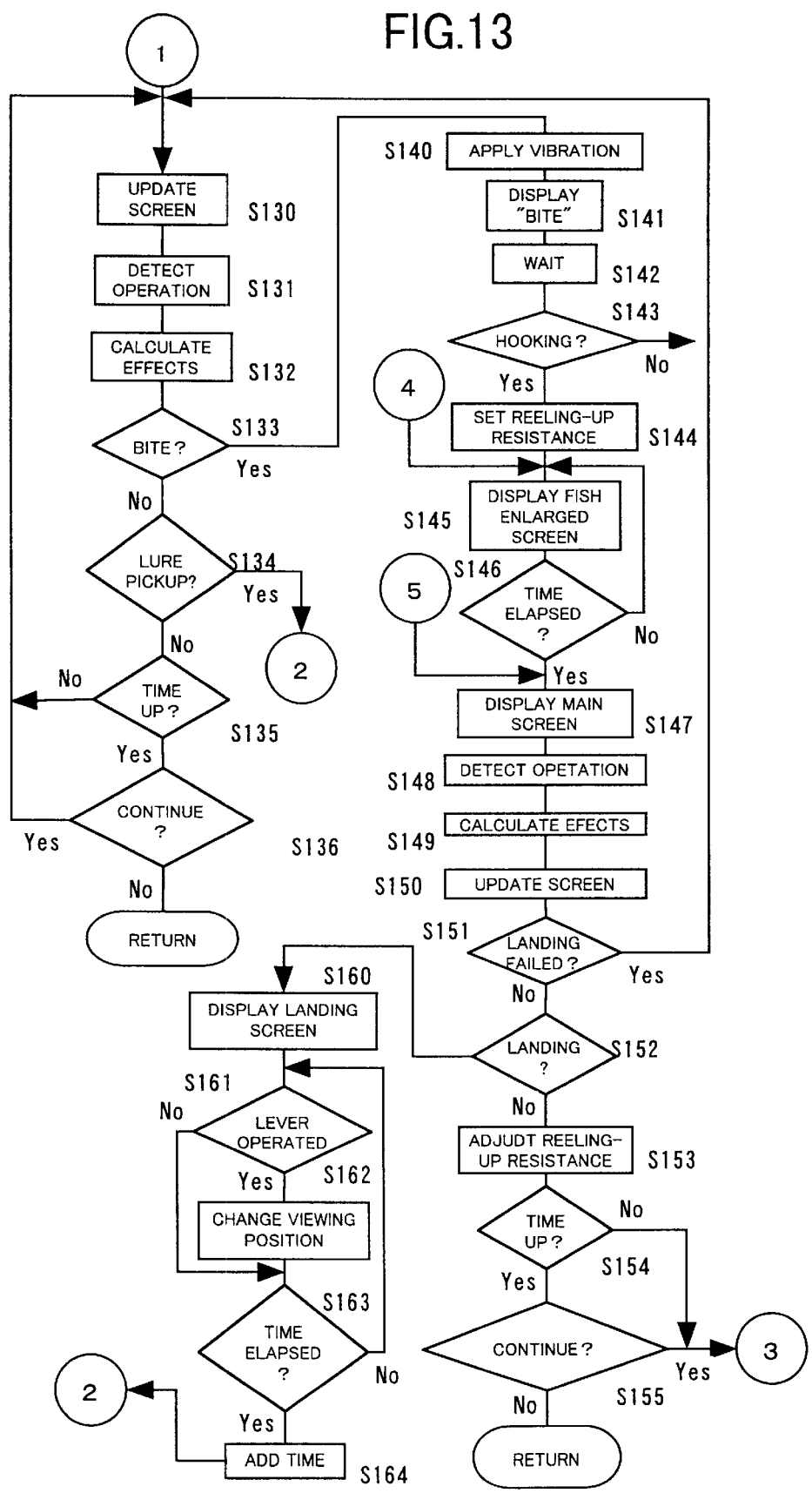
FIG. 13 is a flowchart showing steps following the flowchart in FIG. 12.
Figure 14:
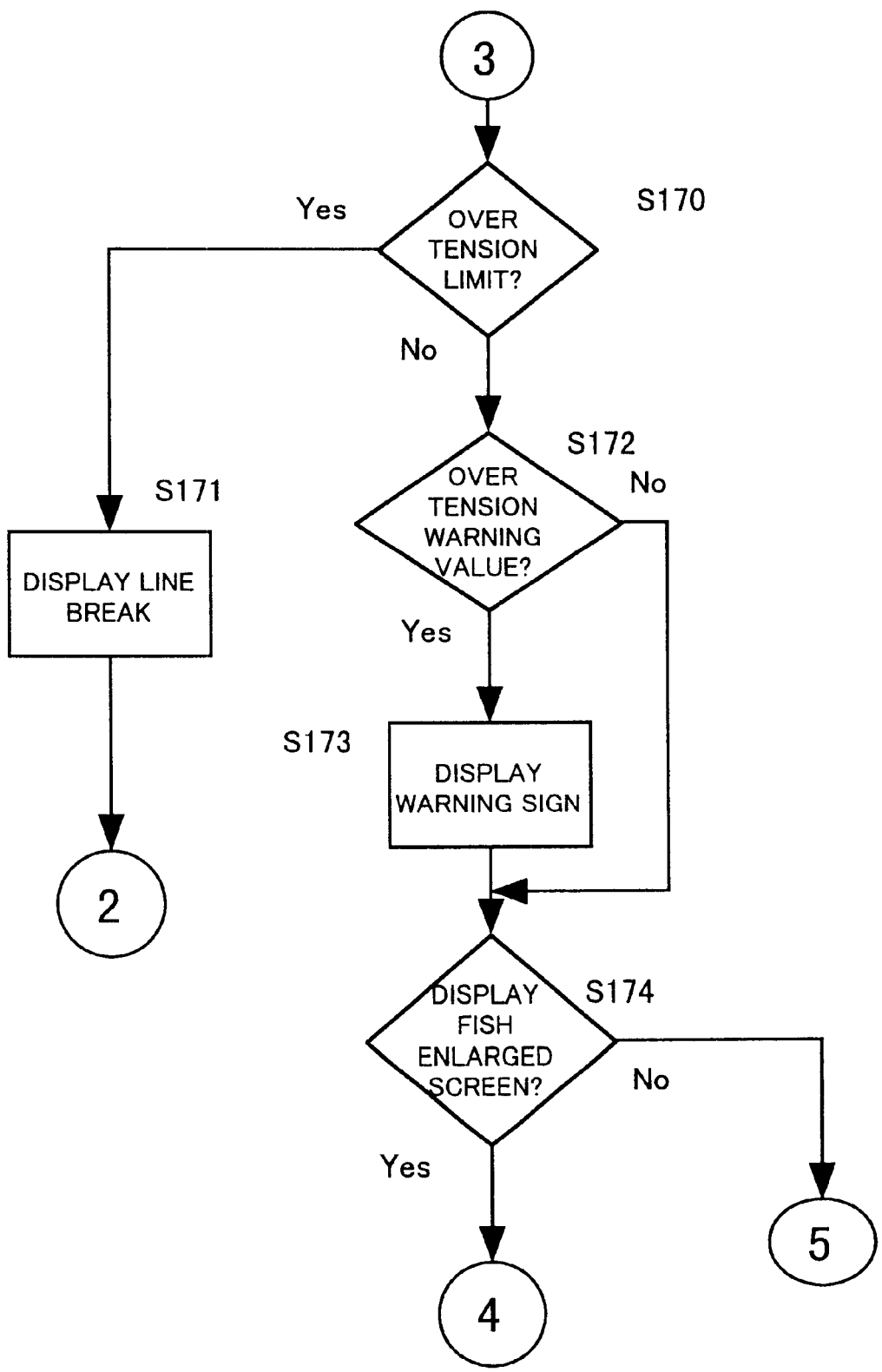
FIG. 14 is a flowchart showing steps following the flowchart in FIG. 13.
Figure 16:
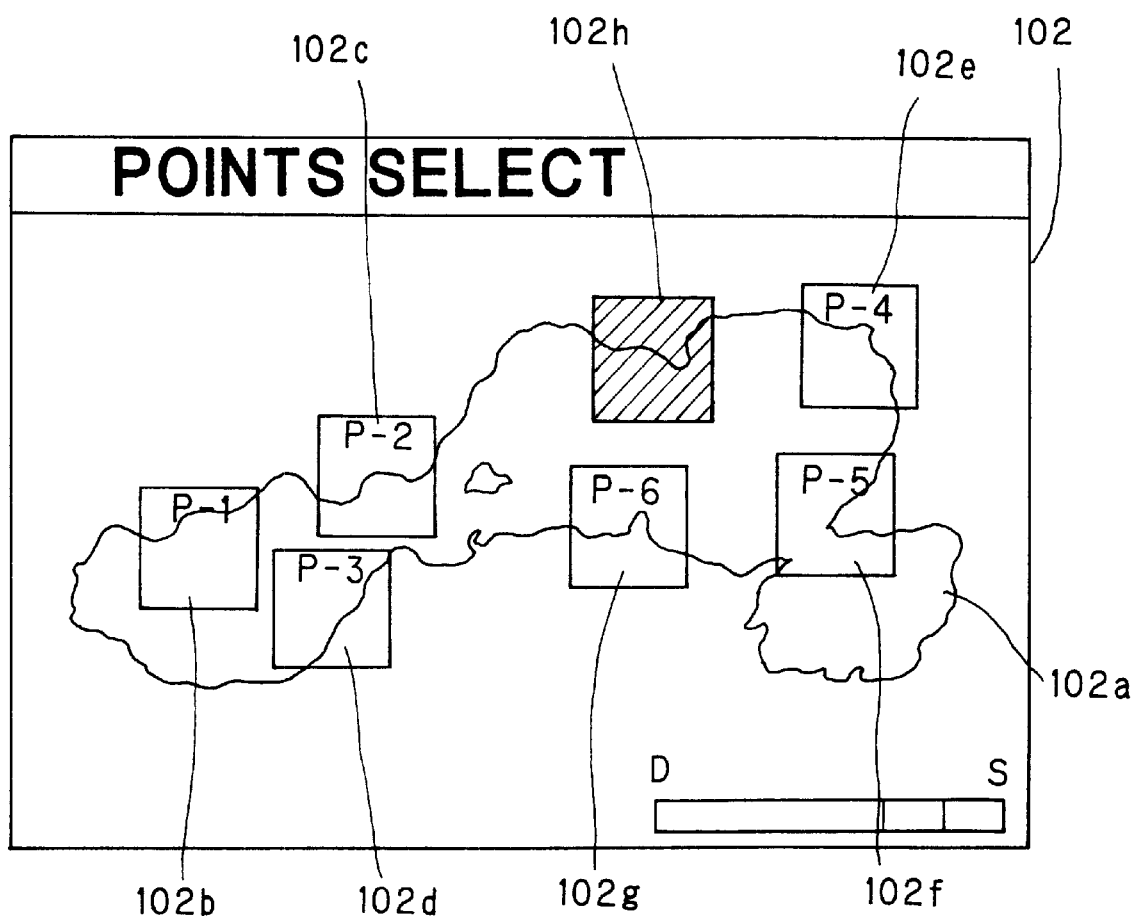
FIG. 16 is an example of an image for selecting a desired fishing point.

The processing for the game shown in FIG. 11 (step S12) is actually performed according to procedures shown in FIGS. 12 to 14. In the processing, the point selecting process to select a fishing point in the selected lakes is executed to decide at which point the player wish to fish (step S101). As one example, a point selecting image 102 is displayed as shown in FIG. 16, which includes an image 102a of the lake selected by the player (an aerial photographed image of Kawaguchi lake in FIG. 16) and a plurality of identification marks 102b, 102c, . . . showing the fishing points preset beforehand on the lake. In response to the desired point selection by the player with the input device 4, the selection is detected by the CPU 50 and then written into the RAM 54.

After the selection of the fishing point, the process for the selection of a lure to be used for fishing is executed (step S102 in FIG. 12). In this embodiment, a variety of types of lures used frequently for the black bass fishing are selectable, such as a top-water plug, a vibration plug, worm, and so on, and additionally, a plurality of colors and/or shapes are prepared even for the same type lure. The selectable lures are displayed in a table on the screen of the display device 3. When the player selects a desired lure with the input device 4, the selection is detected by the CPU 50, and then the associated information is written into the RAM 54.

After this, an easy-to-fish degree is evaluated for the fishing point selected by the player based on a given formula. Practically, the fishing point is divided into a grid-like areas defined by a specified number, and an easy-to-fish degree for each area is set to one of ten degrees according to the given formula. Various theories and rules known in the actual bass fishing are reflected on the formula. For example, a configuration, structures in the water, vegetation, and others have been preset for each fishing point, and the season and the weather are set in the game, so that the easy-to-fish degree is totally determined with considering such information.

Figure 17:
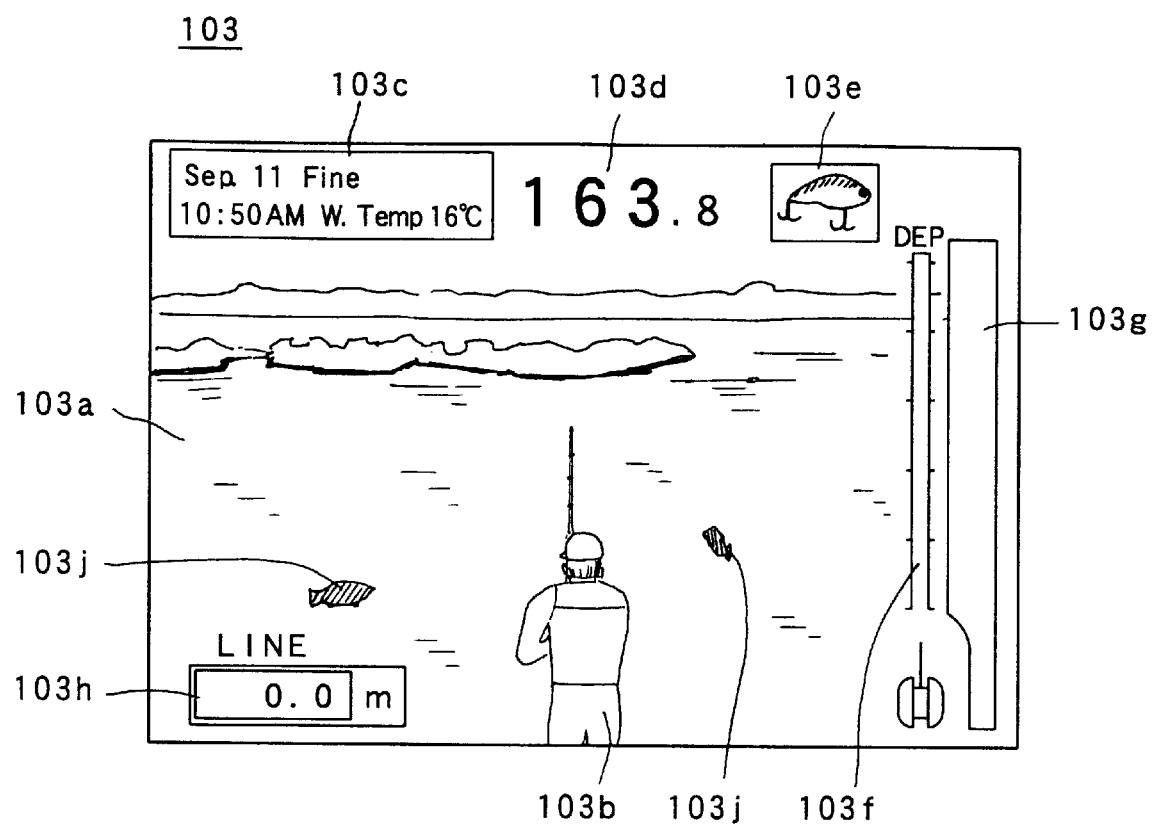
FIG. 17 shows an example of a main screen displayed during the game processing in FIG. 12.

Thereafter, the process proceeds to step S104, wherein a timer for measuring a remaining play time of the game is activated. This process is followed by displaying a main screen 103 shown in FIG. 17 (step S105). The main screen 103, which uses actually-photographed data to visualize the fishing location, includes a background displaying portion 103a showing the fishing point selected by the player and a player displaying portion 103b showing the angler. Additionally, from the left to the right on the upper part of the screen, a data displaying window 103c, a remaining play time displaying window 103d, and a lure displaying window 103e are mapped individually. In the data displaying window 103c, the present date, time, weather, water temperature in the game are displayed. In the remaining play time displaying window 103d, a remaining play time during which the player is allowed to continue playing is displayed. In the lure displaying window 103e, a lure image that the player uses at present is shown.

At the right side on the main screen 103, a water depth gauge 103f and a line tension gauge 103g are individually superposed, and a fishing line length displaying window 103h is superposed at the lower left portion thereof. The water depth gauge 103f is used to show a depth of water at which the lure is swimming. The lower end of the water depth gauge 103f indicates 5 meters deep and the upper end thereof indicates the water surface. The line tension gauge 103g shows a tension applied to the fishing line, and the lower and upper ends thereof correspond to the tension of zero and a preset maximum tension, respectively. The fishing line length displaying window 103h shows a numerical length of the fishing line being drawn out from the reel.

One or more fish shadows 103j are displayed in the background displaying portion of the main screen 103. The positions of the fish shadows 103j are determined on the basis of the easy-to-fish degree evaluated at step S103. In this example, it is now assumed that the fishing point displayed by the background displaying portion 103a is divided into grid-like areas of a predetermined number in each of the lateral and longitudinal directions. It is further assumed that the most difficult-to-fish grid is expressed by 0 in the ten levels in total and the easiest-to-fish grid is expressed by 9, part of the grids which have the evaluation values of 4 to 7 are extracted at random, and the fish shadows 103j are displayed at the extracted grids. This setting is able to visualize the fish shadows 103j at relatively easy-to-fish points, giving the player hints about good target points in a casting operation later described. Although proper hints are given the player, the easiest-to-fish areas are still hidden. This provides the player a fun or enjoyment to find out the hidden fishes in the secret points, increasing depth in palying the game.

After the display of the main screen 103, it is determined if the player performed direction changes to operate the operation lever 10 in the lateral direction (step S106). When the directions were changed, the range of the background image displayed in the background displaying portion 103a is changed according to the operated new direction (step S107). For instance, if the operation lever 10 is moved rightward, the background image is scrolled to the left side in the image 103. In contrast, if the operation lever 10 is moved leftward, the background image is scrolled to the right side in the image 103.

After the processing at step S107 or the negative determination at step S106, it is determined whether or not the push-button switch 7, assigned to a casting button, was pushed (step S108). If it is not pushed yet, it is further determined whether or not the player operated the operation button 26 of the housing 15, which corresponds to an operation changing conditions, on the basis of the output of the limit switch 28 (step S109). If there was such operation for changing conditions, predetermined condition changing processing is performed (step S110), and then the process goes to step S111. In the condition changing processing, the lure in use or the fishing point is changed to another one according to the operation by the player.

After the processing at step S110 or the negative determination at step S109, it is further determined whether or not the time is up, that is, whether or not the time set to the timer activated at step S104 reached a predetermined time for game (step S111). If the time is not up yet, the process returns to step S105. If the time is up, it is then determined whether or not the player performed an operation for continuing the game (for example, additional insertion of coins and so on) within a limited interval (step S112). If Yes, the process returns to step S105.

Figure 18A:
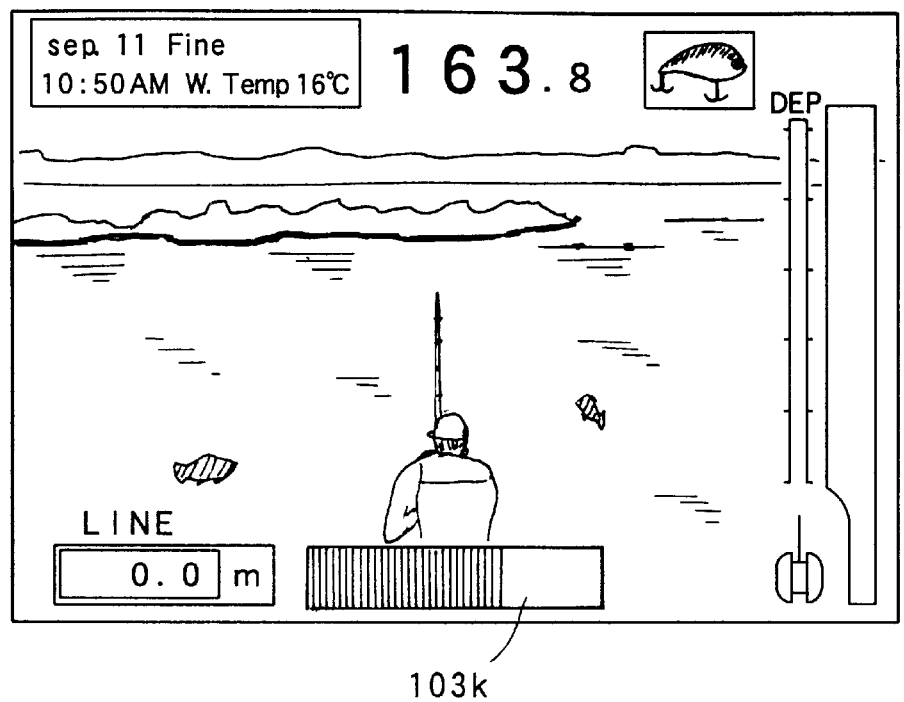
FIGS. 18A and 18B are images for explaining main screens partly changed.

If it is determined at step S108 that the push-button switch 7 serving as the casting button is pushed, the process proceeds to step S120. At step S120, a casting gauge 103k is displayed at the lower center in the main screen 103, as shown in FIG. 18A. The gauge 103k, which displays a degree of lure casting force, is configured such that the lure casting force becomes larger as the gauge length from the left end of the gauge 103k becomes longer. Concurrently with the display of the casting gauge 103k at step S120, an animation display that the gauge amount of the gauge 103k is repeatedly changed from the left to right at a certain rate is started.

Following the display of the casting gauge 103k, it is further determined if the player pushed the casting button (i.e., the push-button switch 7) again (step S121). This determination is repeated until the casting button is pushed. In response to the operation of the cast button, the CPU 50 recognizes the casting operation, and executes process for deciding a lure falling position (i.e., a cast position of the lure on the water surface) (step S122). In this process, the CPU 50 decides the lure casting distance based on the gauge amount at the time the player pushed the casting button. The CPU 50 determines the operated amount of the operation lever 10 in the lateral direction at the time of the casting operation on the basis of an output signal from the lever operation detecting sensor 18a, and decides the lure casting direction on the basis of the operated amount. As described above, adjusting both operated timing of the push-button switch 7 and an operated amount of the operation lever 10 in the lateral direction makes it possible to cast a lure to a desired position within the background image displayed in the main screen.

After the casting position of the lure is decided at step S122, the process goes to step S130 in FIG. 13. In the processing of FIGS. 13 and 14, based on operation of the operation lever 10, the handle 20 and the operation button 26, indispensable information to progress the fishing game, for example, the tension of the fishing line, the lure position, the water depth and the lure depth in water at the lure position and the velocity vector of the lure, is properly determined, and the determined information is written into the RAM 54. In this determination, unless particular explanation is provided, the operation of the operation lever 10 in the forward-backward direction corresponds to shaking or swinging an actual fishing rod up and down, the operation of the operation lever 10 in the lateral direction corresponds to moving the actual fishing rod rightward and leftward, the rotation of the handle 20 clockwise when viewing from its right side corresponds to reeling up the fishing line, and the pushing the operation button 26 corresponds to loosening the tension of the fishing line to allow the fishing line to be drawn out from the reel, respectively. That is, in agreement with operation of the fishing rod and the reel in actual fishing, the operation and conditions of fishing are related to each other. This relation enables the player to have a feeling as if he were in an actual fishing spot to enjoy fishing.

Figure 18B:
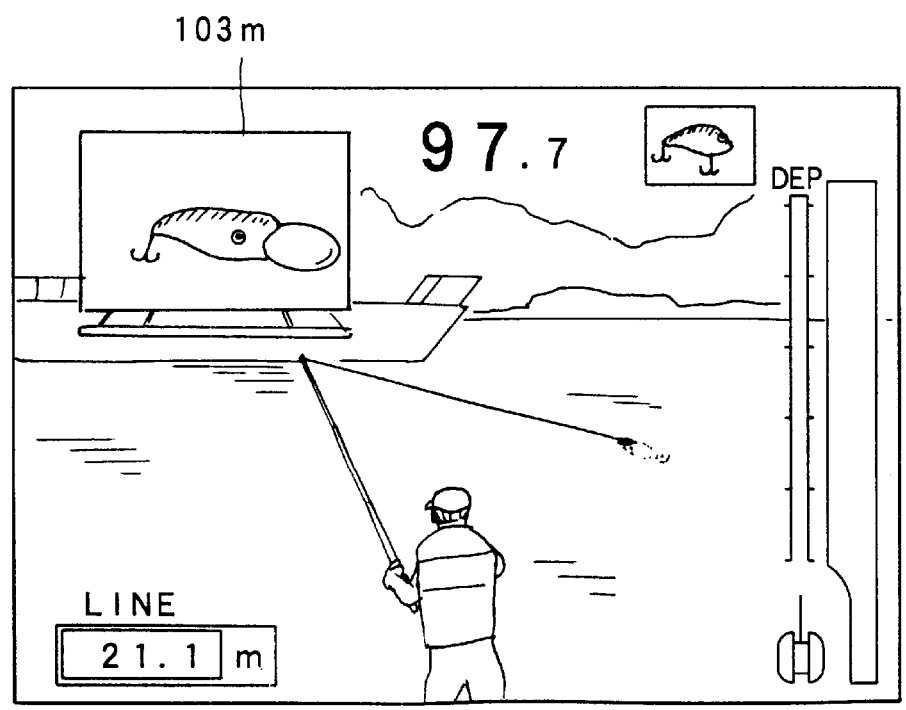

In the processing in FIG. 13, the CPU 50 reads information specifying the current playing state from the RAM 54, and updates the display of the main screen 103 based on the read information. As shown in FIG. 18B, when the lure is in the water, the data displaying window 103c is omitted from the main screen 103, and instead of it, a lure window 103m which shows a state of the lure as an enlarged view is additionally displayed. Since no fish bites the lure at step S130, the gauged amount by the tension gauge 103g is maintained at a certain value which corresponds to the tension of reeling up only the lure, but information other than the tension gauge in the main screen 103 is updated to the newest one. For example, in the background displaying portion 103a, a state of the fishing line drawn out from the reel is changed on the screen depending on the current lure position. Also, in the player displaying portion 103b, a display mode is sequentially updated such that a player on the screen moves the fishing rod right and left correspondingly to the operation lever 10 operated in the lateral direction. Likewise, each window 103d, 103f, and 103h is updated to each newest information. In the lure window 103m, the display state of the lure are sequentially changed in such a manner that the lure is displayed to move in the water dependently upon the operation of the operation lever 10 and the handle 20.

After the screen 103 has been updated, on the basis of the output signals from the lever operation detecting sensor 18a, the photosensors 23 and limit switch 28, the operation of the operation lever 10, the handle 20 and the operation button 26 are detected within a certain interval (step S131). Then, the effects resulted from the detected operation are calculated according to a given formula (step S132). At step 132, for example, the length of the fishing line drawn out from the reel, the lure position, the lure depth, the velocity vector of the lure and others are calculated on the basis of the rotation speed of the handle 20, the operated amount and the operated direction of the operation lever 10 and the type of lure. On the basis of the calculated results and parameters such as the easy-to-fish degree set for the currently-selected fishing point, the calculation for determining whether there should be a "bite" (that is, whether a fish bites the lure or not) is performed. In the case of "bite," a type and sizes of the fish are determined in accordance with given conditions, and the tension value of the fishing line is calculated on the obtained results. In this calculation, the tension is set proportionally to the sizes and activities of the fish.

After determining the effects resulting from the operation, it is determined if there is a "bite" or not based on the calculated result (step S133). If the determination is negative, it is determined whether or not the lure is picked up out of the water (step S134). When the lure is picked up, the process returns to step S105 in FIG. 12. If the lure is still in the water, it is determined whether or not the time is up (step S135 in FIG. 13). Then, the process goes to step S130 unless the time is up. In the case of the time-up, it is then determined whether or not the player performed an operation for continuing the game (for example, additional insertion of coins) within the limited time (step S136), and then the process returns to step S130 if the continuing operation is performed. If there is no continuing operation, the game ends and the process returns to the foregoing process, for example, the process in FIG. 11.

If the "bite" is detected at step S133 in FIG. 13, the vibrator 30 is activated to apply vibrations to the operation lever 10 (step S140). For performing this processing, the CPU 50 outputs to the drive circuit 58 (refer to FIG. 7) a current setting signal which changes dependently on the type and sizes of the fish specified at step S132. Thus, degrees of applying vibrations by the vibrator 30 are also controlled with changes in the current setting signal. For example, when a bigger fish or a more active fish is caught, the degrees of applying vibrations are set to larger intensities proportionally to its size or activities, raising the player's expectation. After applying the vibrations, the display visually shows an occurrence of the "bite" to the player (step S141). One such example is that a mark representing the "bite" is additionally displayed in the lure displaying window 103e of the main screen 103.

When the bite is displayed, the process then waits for a given interval (step S142), during which it is determined whether or not the hooking, that is, setting the hook at the fish mouth is made on the basis of operation of the operation lever 10 and the handle 20 (step S143). In actual fishing, the fishing rod is lifted up or the fishing line is reeled up to set the hook to the mouth of the fish (this is called "hooking" operation), and hence it is determined whether or not the hooking operation has made with the operation lever 10 or the handle 20. If it is judged that the player failed the hooking, the process returns to step S130.

Figure 19:
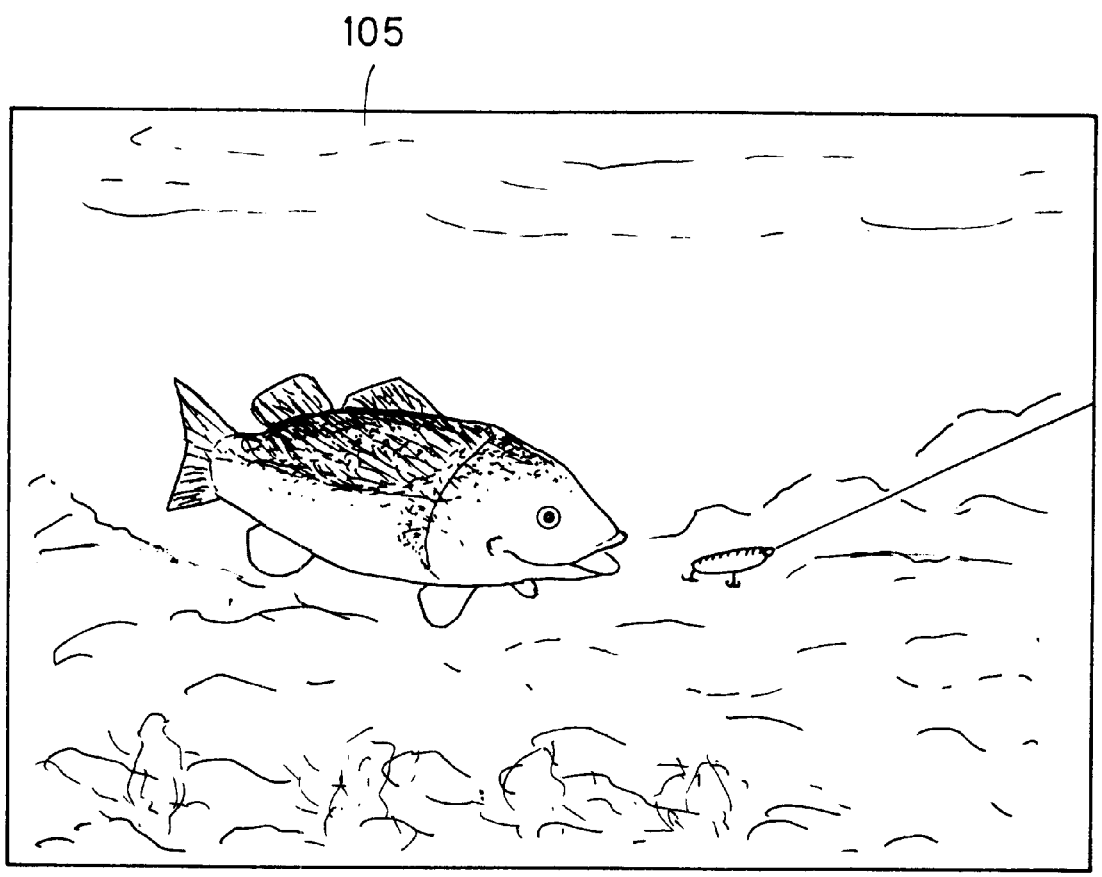
FIG. 19 is an example showing a fish enlarging screen displayed when a fish is going to bite a lure.

When it is determined that the hooking has succeeded, the braking force of the electromagnetic brake 25 is set based on the tension of the fishing line set at step S132. Namely, the larger the tension set at step S132 is, the higher the level of the current setting signal outputted from the CPU 50 to the drive circuit 57 becomes, thereby increasing the rotational resistance of the handle 20. This can exalt the player's expectation. Next, an enlarged screen 105 (refer to FIG. 19) is displayed for a given time interval to show the state of the fish by the enlarged images (steps S145 to S146). The main screen 103 is then displayed again (step S147).

After the re-display of the main screen 103, the operations of the operation lever 10, the handle 20 and the operation button 26 are detected for a certain time interval (step S148), and the effects resulted by the detected operations are calculated (step S149). In the calculation, like the step S132, the length of the fishing line drawn out of the reel, the lure position, the lure depth, the velocity vector of the lure and others are calculated on the basis of the rotation speed of the handle 20, the operated amount and the operated direction of the operation lever 10 and the type of the lure. Further, from the relationship between the reeling-up speed of the handle 20 and/or the operated states of the operation lever 10 in the forward-backward and lateral directions as well as the behavior of the fish, the tension of the fishing line and the hooking state are calculated. In this embodiment, such calculation is performed based on a formula set to provide variations in tension such that if the fight with the fish has continued for a given time, the fish is regarded as being tired, so that the tension is lowered, and/or if the lowered tension state has continued for a given time, the fish is regarded as becoming vigorous again, so that the tension is increased again. Based on those calculated results, the calculation for determining if "landing failure," that is, a situation that the player fails to land (catch) the fish for some reasons such as the hook being removed from the fish mouth, the fishing line breaks and so on, is performed.

After the calculation at step S149, the display of the main screen 103 is updated based on the calculated results (step S150). At this stage, in addition to changing states of the fishing line and the positions of the fishing rod, the image of the fish jumping above the water surface may be displayed dependently upon the state of the fish. It is considered that such a display makes the player imagine an actual fighting with fish.

Next, based on the calculated results in step S149, it is determined whether the landing failure took place or not (step S151), and if the landing failure took place, the process returns to step S130. In contrast, if the landing failure does not take place yet, it is then determined whether or not the fish has been successfully landed (step S152). If not, the process goes to step S153, wherein the rotational resistance (reeling resistance) of the handle 20 by the electromagnetic brake 25 is readjusted according to a new tension calculated at step S149. For example, the braking force of the electromagnetic brake 25 is lowered to decrease the rotational resistance of the handle 20. Such control of the resistance of the handle 20 can give the player a feeling of actually fighting with the fish.

After the adjustment of the electromagnetic brake 25, it is determined whether the time is up or not (step S154). As long as the time for game remains, the process proceeds to step S170 in FIG. 14. If the time is up, it is judged whether the player performed the operation for continuing the game (for example, additional insertion of coins) within a given interval (step S155). If such operation is made, the process goes to step S170 in FIG. 14. On the contrary, if the continuing operation is not made, the process for game ends, and the process returns to FIG. 11, for example.

At step S170 in FIG. 14, it is determined whether or not the tension calculated at step S149 is larger than a specified limit. If the tension is larger than the limit, the occurrence of a line break, that is, cutting of the fishing line, is displayed for the player (step S171), and the process returns to step S105 in FIG. 12. To avoid the line break, the player is required to push the operational button 26 to reduce the line tension. If the line tension is not more than the limit, it is further determined if the tension is not less than a warning value which is set to be smaller than the above limit (step S172). If the line tension is equal to or larger than the warning value, a predetermined warning sign is displayed for the operator (step S173), and then the process proceeds to step S174. If it is determined at step S172 that the line tension is less than the warning value, step S173 is omitted and the process proceeds to step S174. The warning sign issued at step S173 may be the change of the gauge color displayed by the tension gauge 103g, or the flickering of the gauge.

At step S174, based on the calculation results at step S149, it is determined whether or not the fish enlarging screen 105 (refer to FIG. 19) is required to be displayed. Preferably, if the line tension gets high during the fighting with the fish or any other situations occur, the fish enlarging screen 105 is temporarily displayed to raise a feeling of tension in the game. If the affirmative determination is made at step S174, the process goes to step S145 in FIG. 13, and if the negative determination is made, the process goes to step S147 in FIG. 13.

Figure 20:
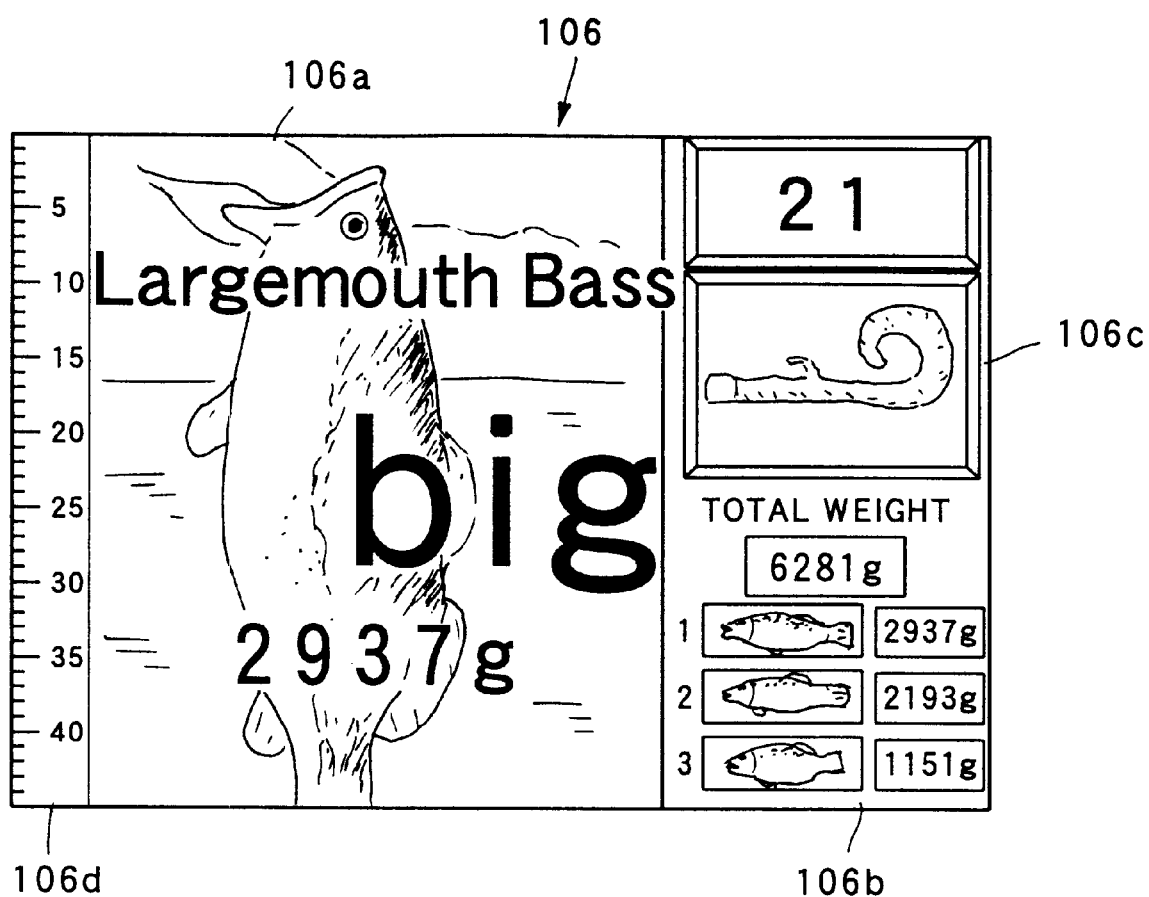
FIG. 20 is an example of a fish landing screen displayed when a fish is caught.

If it is determined at step S152 in FIG. 13 that the fish has been successfully landed, the fish landing screen 106 is displayed, as shown in FIG. 20 (step S160). Individually displayed in this screen 106 are a fish displaying portion 106a wherein the landed fish is shown, an information displaying portion 106b wherein the body length, weight and others of the fish are shown, a lure displaying portion 106c wherein the lure used in this fishing is shown, and a scale 106d for visualizing the body length of the fish caught.

A scaling factor of the fish in the fish displaying portion 106a shown in FIG. 20 is set such that if a big fish larger than a given body length (for example, 50 cm) is caught, a part of the fish is not shown within the screen 106. When the player moves the operation lever 10 in the forward-backward direction, the fish image displayed in the fish displaying portion 106a is scrolled in its longitudinal direction, so that the non-illustrated part of the fish comes into the screen 106. Specifically, when the operation lever 10 is pulled toward the player, the fish image is scrolled up as if the fishing rod pulled up, whereas the operation lever 10 is pushed away, the fish image is scrolled down as if the fishing rod was down. Furthermore, if the player moves the operation rod in the lateral direction, the fish image shown in the fish displaying portion 106a changes its directions in the lateral direction, providing an image wherein the fish is viewed from different direction.

In order to change the positions of the fish image in the fish displaying portion 106a in dependence upon such a movement of the operation lever 10, the CPU 50 determines whether or not the operation lever 10 has been operated, after the execution of step S160 in FIG. 13 (step S161). If such operation is detected, the fish viewing position is changed dependently upon the operation (step S162), and the fish image viewed from a different viewing position is displayed on the display device 3. After the change of the viewing positions or after the negative determination at step S161, it is determined whether or not the fish landing screen 106 has been displayed for a given period of time (step S163). If the determination is negative at step S163, the process goes to step S161. If the determination is positive at step S163, an additional time determined based on the type and weight of the fish caught is added to the remaining game playing time in the timer (step S164). Then the process goes to step S105 in FIG. 12.

Figure 21A:
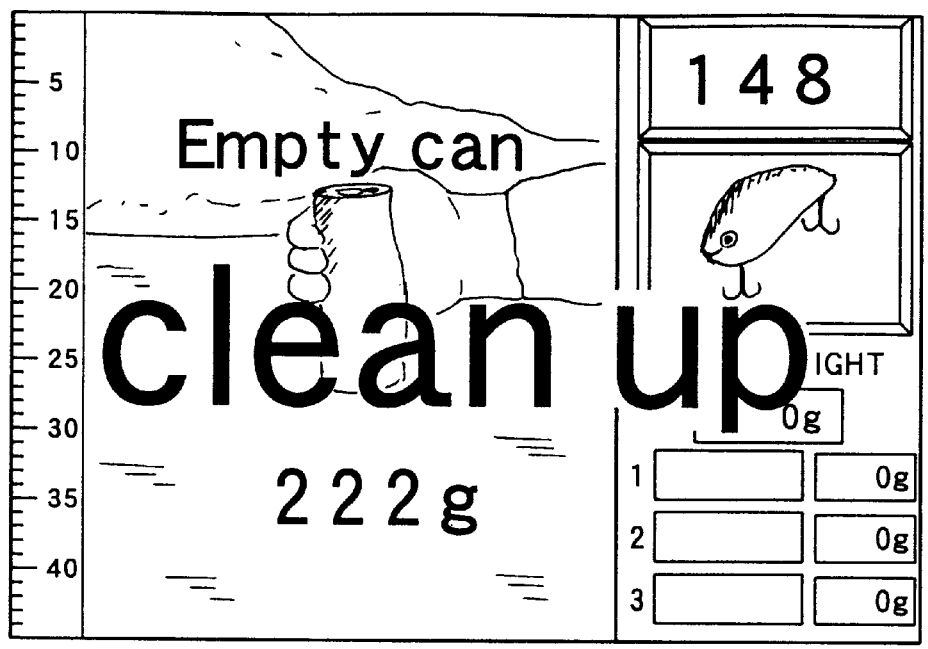
FIGS. 21A and 21B are examples of catch-thing screens displayed when things other than fishes are caught.
Figure 21B:
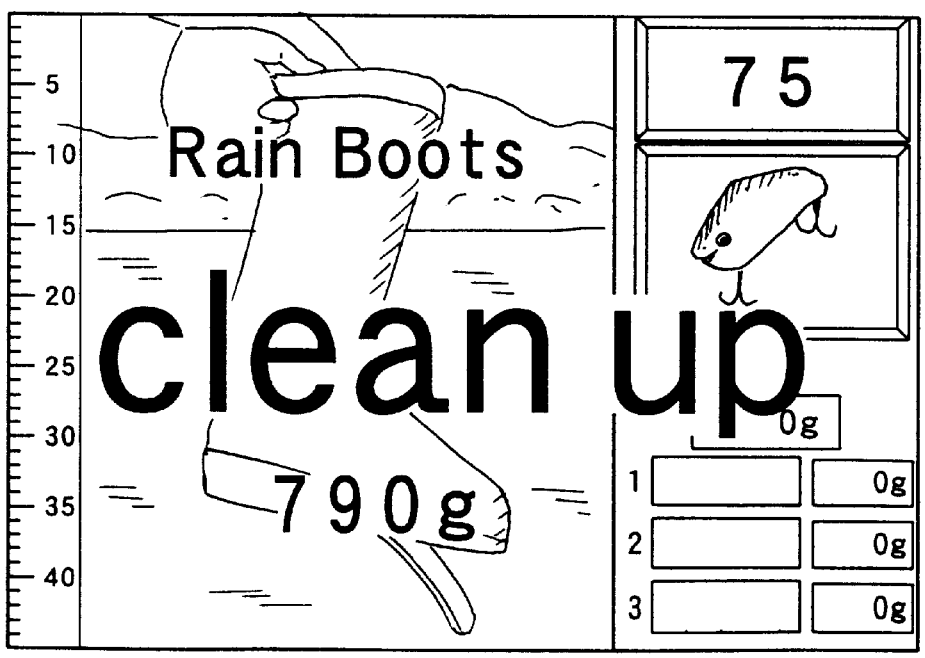

The additional time to be added to the timer is set to be longer as the weight of the caught fish becomes larger. If a target fish (e.g., black bass in this example) is caught, the additional time is set to be longer values than in the case that non-target fishes (i.e., various kinds of small fishes other than black bass) are caught. this game system is designed such that things or articles other than fishes can be caught. For example, as shown in FIG. 21A, an empty can might be caught, or, as shown in FIG. 21B, a rain boot might be caught. In such cases, it is considered that the player contributes to cleaning up the fishing place, so the additional time is set to a longer value than in fishing the non-target fishes.

The beginners' mode shown in FIG. 10 (step S7) is limited in terms of selectable lakes than in the training mode, and is a mode which gives the operational explanation for helping the player at necessary occasions in the course of the game (its detailed description is omitted herein). On one hand, the tournament mode (step S9) is designed to make the players compete against each other in total achievements through the fishing tour of the three lakes shown in FIG. 15, and is executed according to the procedures shown in FIG. 22.

Figure 22:
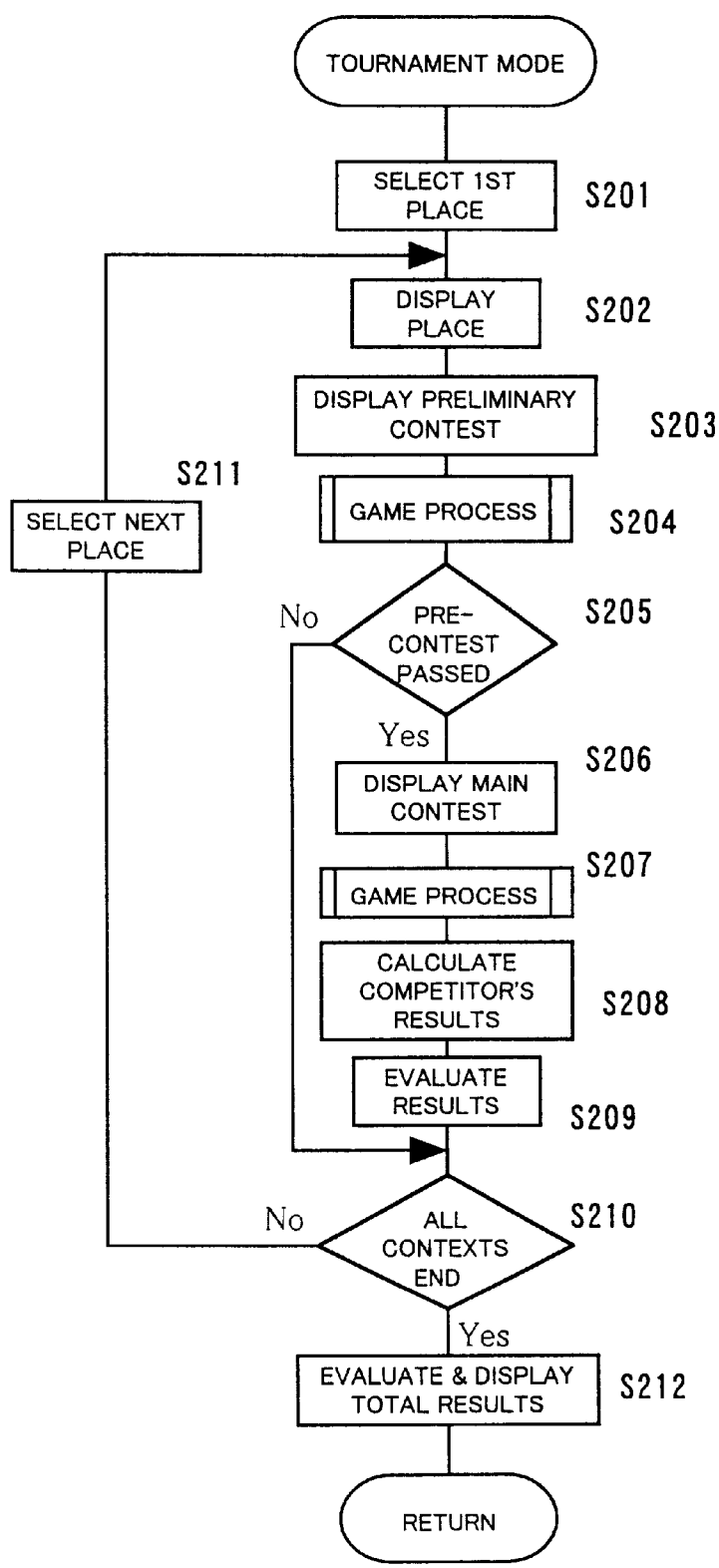
FIG. 22 is a flowchart representing the processing of a tournament mode executed in the main routine in FIG. 10.

In the process of FIG. 22, as a first place of a fishing contest, any one of the three lakes is selected (step S201), and the selected place is displayed on the display device 3 (step S202). Then the start of a preliminary contest is displayed (step S202), and then the execution of the game process as the preliminary contest will follow (step S204). The game process is executed in the same way as that shown in FIGS. 12 to 14. However, it is noted that a play time for the preliminary contest is fixed, so the time-adding process (refer to step S164 in FIG. 13) is not executed.

After step S204, it is determined whether or not the fishing results obtained in the preliminary contest meet a predetermined criteria for passing the preliminary contest (step S205). For example, if the player catches the target fishes having a weight more than a specified amount, the player passes the preliminary contest. When the player passed the preliminary contest, the start of a main contest is displayed (step S206). Then, the game process as the main contest is executed in the same lake as in the preliminary contest (step S207). This game process as the main contest is also executed in the same way as that shown in FIGS. 12 to 14. The play time for the main contest is also fixed, so the time-adding process (refer to step S164 in FIG. 13) is omitted.

After the game process of the main contest ends, the results of competitors are calculated (step S208). In this calculation, on the assumption that a specified number of competitors (for example, 20 persons) other than the player participate in the main contest, the fishing result of each parson is calculated based on a given calculating formula. This calculation may be carried out timely in parallel with the execution of the game process. After calculating the results of all competitors, their results are evaluated (step S209). At this process, the fishing result of the player in the main contest is compared to the fishing results of the competitors calculated at step S209 to decide the player's ranking, and the result and the ranking of the player is displayed.

After this evaluation of the fishing results, it is determined whether or not all the contests, that is, all the games for the three lakes, have completed (step S210). If not completed, the next place of the fishing contest is selected, and the process returns to Step S202. If it is determined at step S205 that the player has failed to pass the preliminary contest, the process for the main contest (steps S206 to 209) is omitted and process at step S210 is carried out. If it is determined at step S210 that all the contests have completed, the total results of the player through the three lakes and those of the competitors are compared to each other, so that the player's ranking is decided and displayed (step S212). Then the tournament mode is finished, and the process returns to step S2 in FIG. 10.

Figure 23:
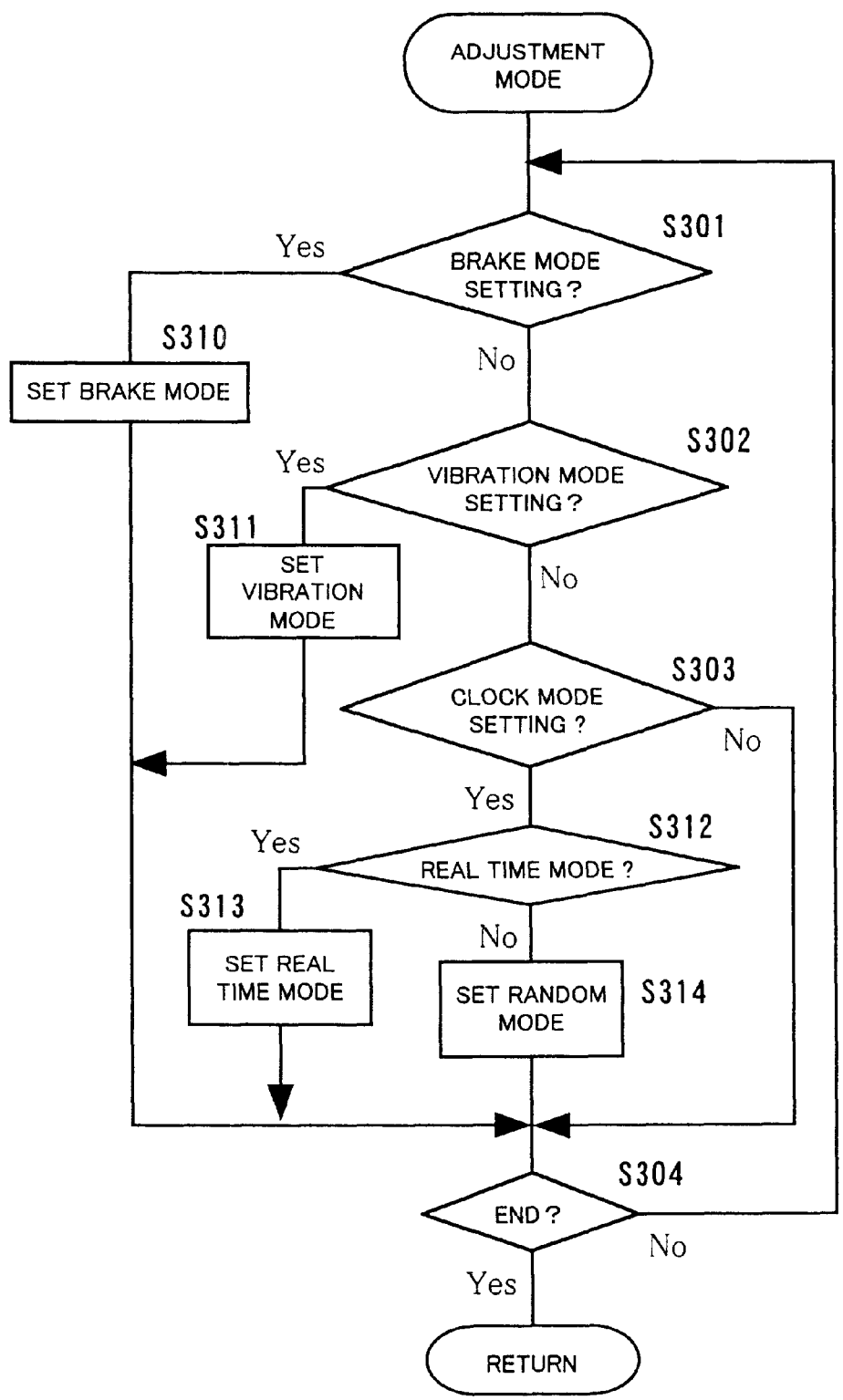
FIG. 23 is a flowchart representing procedures for an adjustment mode executed by the CPU arranged in FIG. 7.

FIG. 23 is a flowchart representing the process of an adjustment mode executed by the CPU 50. When an input selecting the adjustment mode is made in the game system, the CPU 50 executes the adjustment mode process shown in FIG. 23. This adjustment mode is performed to set various information associated with the game process in FIGS. 12 to 14. In the example shown in FIG. 23, information about the operations of the electromagnetic brake 25 and the vibrator 30, as well as information about a clock used in the game, are set. This process is designed to be executed by an operator or manager of this game system 1 who manages the setting state of the game system 1. In order to prevent the players' wrong operations, the selection of the adjustment mode is made by operating a covered, internal switch installed in the frame 2 of the game system 1, for example.

In the processing of FIG. 23, it is determined whether or not the operator, who performed the adjustment mode selecting operation, has instructed the setting of the brake mode (step S301). If the negative determination is made, then it is determined whether or not the operator has instructed the setting of the vibration mode (step S302). If the vibration mode is not set, it is determined if the operator has instructed the setting of the clock mode (step S303). If not, it is determined whether or not the operator has operated the termination of the adjustment mode (step S304). In response to the determination of the termination, the adjustment mode is terminated, otherwise the process returns to step S301. The instructions from steps S301 to S303 are supplied to the CPU 50 through, for example, the input device 4.

Figure 24:
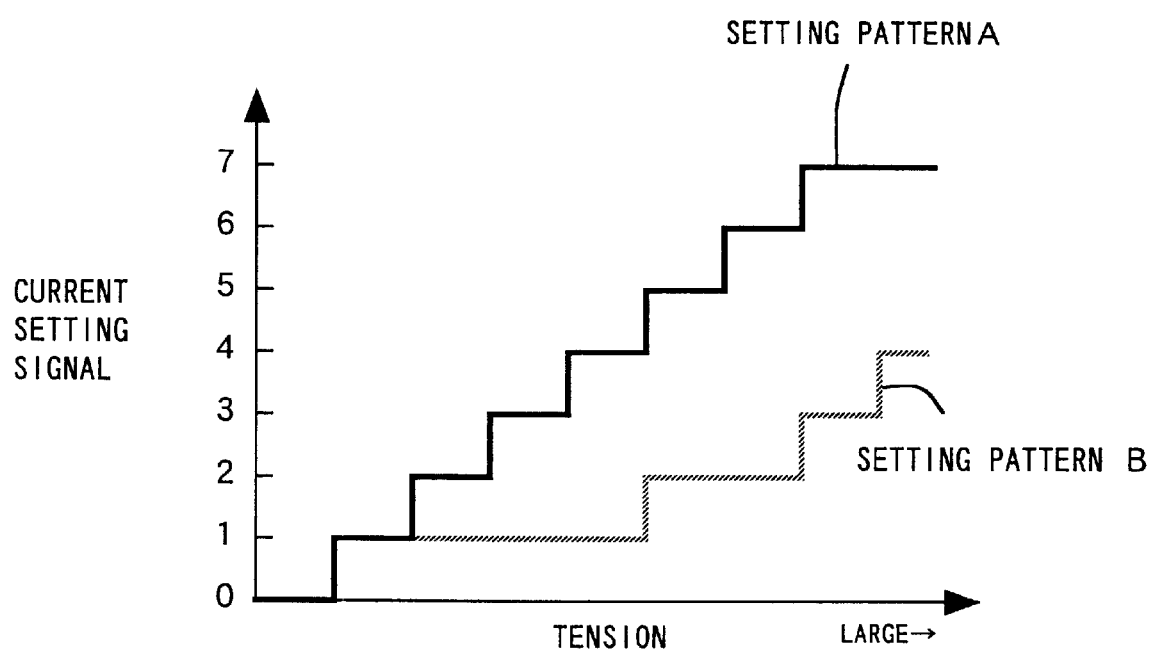
FIG. 24 shows an example of setting a braking mode adjustable by the processing of FIG. 23.

If the affirmative determination is obtained at step S301, the CPU 50 sets the brake mode based on the instructions sent from the input device 4 (step S310). The brake mode is used to select, from a plurality of setting states prepared in advance, the relationship between the tension applied to a fishing line in game process and the level of the current setting signal (refer to FIG. 9) outputted from the CPU 50 to the drive circuit 57 of the electromagnetic brake 25. For instance, as shown in FIG. 24, if two kinds of setting patterns A and B, which are different from each other in terms of the relationship between the tension and the current setting signal, are prepared, one of the setting patterns A or B is selected at step S310 responsively to an operator's instruction. The setting pattern A is used to obtain the braking force of the electromagnetic brake 25 increasing largely from its early stages compared to the increasing rate of the tension, while the setting pattern B is used to obtain the braking force increasing not so rapidly compared to the increasing rate of the tension. Such setting patterns are not limited to the above examples, of course, and any pattern may be employed. When the brake mode is set, the set information is written into the RAM 54. Then, at steps S144 and S153 in FIG. 13, a current setting signal defined based on the above setting pattern is outputted from the CPU 50.

When the determination is affirmative at step S302, the vibration mode is set by the CPU 50 on the basis of an instruction given from input device 4 (step S311). The vibration mode is set to select, from a plurality of setting patterns prepared beforehand, the relationship between the sizes or other factors of a fish to be caught and the level of the current setting signal outputted from the CPU 50 to the drive circuit 58 of the vibrator 30. This setting is similar in its practical way to that shown in FIG. 24. When the vibration mode is set, the set information is written into the RAM 54. At step S140 in FIG. 13, the current setting signal is supplied by the CPU 50 according this setting.

If the affirmative determination is made at step S303, based on the instructions given from the input device 4, the CPU 50 determines whether or not the real time mode is instructed (step S312). If the real time mode is selected, the CPU 50 then selects the real time mode as the clock mode (step 313). On the contrary, if not, the CPU 50 selects the random mode (step S314). This selected results are memorized in the RAM 54, and the date displayed in the data displaying portion 103c on the main screen 17 is controlled on the basis of the selected results.

Specifically, in the real time mode, the current date clocked by a clock (not shown) incorporated in the game system 1 is read by the CPU 50, and the same date as that is displayed in the data displaying portion 103c. On one hand, in the random mode, the date is decided at random by the CPU 50 irrespective of the current time clocked by the clock, and the decided date is displayed in the data displaying portion 103c. At step S103 in FIG. 12, the easy-to-fish degree is set in consideration of the date shown in the data displaying portion 103c. Thus, the results of the game is affected by the selected clock mode. By way of example, generally there is a tendency that black bass is relatively easy to fish in spring and autumn, and is difficult to fish in summer and winter. If the real time mode is selected, the easy-to-fish degree is changed according to the seasons in the game which reflects the actual reasons, thereby making the games rich seasonal feelings. In contrast, when the random mode is selected, the seasons are set at random in the game regardless of the actual seasons. Therefore, even when an actual season is not proper for fishing (such as summer or winter in the case of black bass fishing), favorable seasons for fishing (such as spring or autumn) can be realized in the game, thereby offering the players enjoyment.

The gist of the present invention is not restricted to the above-described embodiment, and a variety of modifications are possible for the invention. By way of example, the present invention is not limited to a lure fishing game. Alternatively, various types of fishing including the seashore fishing, beach fishing, or boat fishing can be simulated if the operations of the operation lever 10, the handle 20 and the operation button 26 of the input device 4 are appropriately assigned to the operations of an actual fishing rod and reel. Further, the housing 15 is not limited to the shape imitating a bait reel, but may be an imitation of other reels such as a spinning reel.

Moreover, the support detecting mechanism 18 for the operation lever 10 may detect only an operated direction of the lever axis 11. In the case of the rotation detecting mechanism 21 for the handle 20, the determination of the rotational directions of the handle 20 may be omitted. In such a case, the game may progress on the assumption that a fishing line is reeled up, irrespective of the rotational directions of the handle 20. In stead of using the bush-button switch 7, it is possible to use the operation lever 10 or operation button 26 to perform the casting operation.

Numerous other modifications and variations of the present invention will be apparent to those skilled in the art in view of the foregoing description. Thus, it is to be understood that, within the scope of the appended claims, the present invention may be practiced other than as specifically described hereinabove.

The entire disclosure of Japanese Patent Application No. 09-361872 filed on Dec. 9, 1997 and No. 10-035284 filed on Feb. 17, 1998 including the specification, claims, drawings and summary is incorporated herein by reference in its entirety.

What is claimed is:

1. A fishing game system comprising:
   a display device for displaying an image;
   an input device for outputting a signal in response to an operation by a player; and
   a game control device for referring to the signal outputted from the input device to perform a fishing game on a screen of the display device in accordance with a predetermined procedure,
   wherein the input device comprises:
      a first input unit having an operation lever operable in a lateral direction and a forward-backward direction to the player and for outputting a signal in accordance with the operation of the operation lever by the player, said first input unit having a terminal end which is movable free of attachment thereof to a remainder of the fishing game system; and
      a second input unit having a handle arranged on the operation lever rotatably operable about an axial line in the lateral direction and for outputting a signal in accordance with the operation of the handle, the operation lever comprising a lever axis and a grip arranged at an upper portion of the lever axis, the lever axis comprising, at a lower end portion thereof, a supporting and detecting mechanism for supporting the lever axis in a manner operable in the lateral direction and the forward-backward direction and for outputting an operation signal in accordance with the operation of the lever axis, the grip comprising a hollow housing, the handle of the second input unit being rotatably supported by the housing.

2. The system of claim 1, further comprising an electromagnetic brake disposed in the housing for applying rotational resistance to the handle.

3. The system of claim 1, further comprising resistance adjusting means for changing a rotation resistance of the handle.

4. The system of claim 3, wherein the game control device changes the rotation resistance of the handle adjusted by the resistance adjusting means in accordance with progress of the game.

5. The system of claim 1, further comprising vibrating means for applying vibration to the operation lever.

6. The system of claim 5, wherein the game control device controls a vibration applying state to the operation lever performed by the vibrating means in accordance with progress of the game.

7. The system of claim 1, wherein:
   the input device further comprises a third input unit having an operation element attached on the operation lever independently of the handle and for outputting a signal in accordance with the operation of the operation element, and
   the game control device controls the progress of the fishing game by assigning the operation of the operation element of the third input unit to a loosening operation of a tension of a virtual fishing line used in the game for a period from casting until picking-up of a fishing rig.

8. The system of claim 1, wherein:
the input device further comprises a fourth input unit for outputting a signal in accordance with operation of the player; and
the game control device decides a casting position of a fishing rig in a virtual fishing place realized in the game on the basis of both the operation of the fourth input unit and the operation in the lateral direction of the operation lever.

9. The system of claim 8, wherein, when the fishing rig is cast in the game, the game control device displays a casting gauge on the screen of the display device, changes an amount shown by the gauge continuously, decides a casting distance of the fishing rig based on a relationship between the amount shown by the gauge and an operational timing of the fourth input unit, and decides a casting direction of the fishing rig based on an operated amount in the lateral direction of the operation lever.

10. The system of claim 1, wherein the game control device controls the progress of the fishing game by assigning an operation of the operation lever in the lateral direction to a movement in the lateral direction of a virtual fishing rod used in the game and assigning a rotational operation of the handle in a given direction to a reeling-up operation of a virtual fishing line used in the game for a period from casting until picking-up the fishing rig.

11. The system of claim 1, wherein the game control device displays, on the screen, an image of a fish which was caught in the game and controls a displayed state of the image of the fish to change a viewing position of the fish according to an operation of the operation lever.

12. The system of claim 1, wherein the display device is arranged in a given frame and has a control panel detachably attached to the frame at a position under the display device, the operation lever being attached to the control panel in a manner vertically extending through the control panel.

13. An input device for a game system, comprising:
a first input unit having an operation lever operable in a lateral direction and a forward-backward direction to a player and for outputting a signal in accordance with an operation of the operation lever, said first input unit having a terminal end which is movable free of attachment thereof to the game system; and
a second input unit having a handle arranged on the operation lever rotatably operable about an axial line in the lateral direction and for outputting a signal in accordance with an operation of the handle, the operation lever comprising a lever axis and a grip arranged at an upper portion of the lever axis, the lever axis comprising, at a lower end portion thereof, a supporting and detecting mechanism for supporting the lever axis in a manner operable in the lateral direction and the forward-backward direction and for outputting an operation signal in accordance with the operation of the lever axis, the grip comprising a hollow housing, the handle of the second input unit being rotatably supported by the housing.

14. The device of claim 13, wherein the grip is fixed to the lever axis by bolts.

15. The device of claim 13, further comprising vibrating means disposed in the housing for applying vibration to the operation lever.

16. The device of claim 13, further comprising resistance adjusting means for changing a rotation resistance of the handle according to an input signal.

17. The device of claim 13, further comprising:
an electromagnetic brake disposed in the housing for applying rotational resistance to the handle; and
a brake drive circuit for changing a braking force of the electromagnetic brake according to an input signal.

18. The device of claim 17, wherein the brake drive circuit changes an exciting current supplied to a coil disposed in the electromagnetic brake based on a pulse width modulation control by which a pulse width of the exciting current is controlled according to the input signal.

19. The device of claim 15, further comprising a vibrator including a motor and a weight disposed at an eccentric position from a rotational axis of the motor and rotatable thereby to generate vibration when said weight is rotated by said motor.

20. A fishing game system comprising:
a display device attached on a frame and for displaying an image;
an input device for outputting a signal in response to an operation by a player; and
a game control device for referring to the signal outputted from the input device to perform a fishing game on a screen of the display device in accordance with a predetermined procedure,
wherein the input device comprises:
a first input unit having an operation lever operable in a lateral direction and a forward-backward direction to the player and for outputting a signal in accordance with the operation of the operation lever by the player, said first input unit having a terminal end which is movable free of attachment thereof to a remainder of the fishing game system; and
a second input unit having a handle arranged on the operation lever rotatably operable about an axial line in the lateral direction and for outputting a signal in accordance with the operation of the handle, the operation lever comprising a lever axis vertically passing through a control panel detachably provided on the frame at a position lower than the display device and a grip arranged at an upper portion of the lever axis, the lever axis comprising, at a lower end portion thereof, a supporting and detecting mechanism for supporting the lever axis in a manner operable in the lateral direction and the forward-backward direction and for outputting an operation signal in accordance with the operation of the lever axis, the supporting and detecting mechanism being provided at a position under the control panel, the grip comprising a hollow housing, the handle of the second input unit being rotatably supported by the housing.

21. An input device for a game system comprising a frame, a display device attached to the frame and a control panel detachably provided on the frame at a position lower than the display device, the input device comprising:
a first input unit having an operation lever operable in a lateral direction and a forward-backward direction to a player and for outputting a signal in accordance with an operation of the operation lever, said first input unit having a terminal end which is movable free of attachment thereof to the game system; and
a second input unit having a handle arranged on the operation lever rotatably operable about an axial line in the lateral direction and for outputting a signal in accordance with an operation of the handle, the operation lever comprising a lever axis vertically passing through a control panel detachably provided on the frame at a position lower than the display device and a grip arranged at an upper portion of the lever axis, the lever axis comprising, at a lower end portion thereof, a supporting and detecting mechanism for supporting the lever axis in a manner operable in the lateral direction and the forward-backward direction and for outputting an operation signal in accordance with the operation of the lever axis, the supporting and detecting mechanism being provided at a position under the control panel, the grip comprising a hollow housing, the handle of the second input unit being rotatably supported by the housing.

* * * * *